(12) United States Patent
Hargadon

(10) Patent No.: US 11,673,156 B2
(45) Date of Patent: Jun. 13, 2023

(54) AUTONOMOUS MOBILE COATING APPLICATOR

(71) Applicant: HOPE ROBOTICS LLC, Herndon, VA (US)

(72) Inventor: Michael T. Hargadon, Herndon, VA (US)

(73) Assignee: HOPE ROBOTICS LLC, Herndon, VA (US)

( * ) Notice: Subject to any disclaimer, the term of this patent is extended or adjusted under 35 U.S.C. 154(b) by 0 days.

(21) Appl. No.: 16/282,151

(22) Filed: Feb. 21, 2019

(65) Prior Publication Data

US 2019/0255551 A1    Aug. 22, 2019

Related U.S. Application Data

(60) Provisional application No. 62/633,954, filed on Feb. 22, 2018.

(51) Int. Cl.
| | |
|---|---|
| *B05B 12/12* | (2006.01) |
| *B05B 13/00* | (2006.01) |
| *B05B 13/04* | (2006.01) |
| *B25J 11/00* | (2006.01) |
| *B25J 19/02* | (2006.01) |
| *B25J 5/00* | (2006.01) |
| *B25J 9/16* | (2006.01) |
| *G05D 1/02* | (2020.01) |

(52) U.S. Cl.
CPC .......... *B05B 13/005* (2013.01); *B05B 12/122* (2013.01); *B05B 13/0431* (2013.01); *B25J 5/007* (2013.01); *B25J 9/1664* (2013.01); *B25J 11/0075* (2013.01); *B25J 19/021* (2013.01); *G05D 1/0219* (2013.01); *G05D 1/0274* (2013.01); *G05D 2201/02* (2013.01)

(58) Field of Classification Search
CPC .. B25J 9/1664; B25J 11/0075; B05B 13/0431
See application file for complete search history.

(56) References Cited

U.S. PATENT DOCUMENTS

| | | | | | |
|---|---|---|---|---|---|
| 5,280,433 | A | * | 1/1994 | Ettinger | G05B 19/401 118/669 |
| 5,358,568 | A | * | 10/1994 | Okano | B05B 13/0431 118/323 |
| 5,429,682 | A | * | 7/1995 | Harlow, Jr. | G05B 19/4207 118/681 |
| 6,096,132 | A | * | 8/2000 | Kaiba | B05B 13/0452 118/629 |
| 6,836,700 | B2 | * | 12/2004 | Greene | B25J 9/1664 118/316 |

(Continued)

*Primary Examiner* — Binu Thomas
(74) *Attorney, Agent, or Firm* — MH2 Technology Law Group, LLP

(57) ABSTRACT

An autonomous and self-mobile apparatus for applying a coating to a surface. The self-positioning apparatus can move into an interior or to an exterior of a structure, and can automatically apply a coating, such as paint, to a surface of the room, or a surface of the exterior of the structure, with little or no human intervention or assistance. The apparatus navigates and applies coatings using its sensors and a computer. In some implementations, the system may also include a storage, recharging, and monitoring unit that interconnects with the apparatus for applying a coating to a surface.

9 Claims, 9 Drawing Sheets

(56) References Cited

U.S. PATENT DOCUMENTS

| | | |
|---|---|---|
| 9,089,864 B2 | 7/2015 | Herre et al. |
| 9,289,791 B2 | 3/2016 | Uematsu et al. |
| 2005/0100680 A1* | 5/2005 | Bustgens ............... B05C 5/027 118/300 |
| 2007/0134429 A1* | 6/2007 | Kenmoku ............. B05B 12/084 427/421.1 |
| 2010/0143089 A1* | 6/2010 | Hvass .................. B05B 13/005 414/754 |
| 2012/0219699 A1* | 8/2012 | Pettersson ............ B05B 12/124 118/669 |
| 2013/0284833 A1* | 10/2013 | Fritz .................. B05B 13/0431 239/690 |
| 2014/0242285 A1* | 8/2014 | Pettersson ............ B05B 13/005 118/697 |
| 2015/0147460 A1* | 5/2015 | Manzi ................ B05B 13/0457 118/713 |
| 2019/0118370 A1* | 4/2019 | Rennuit ................ B25J 19/023 |
| 2022/0055057 A1* | 2/2022 | Thompson ........... B05B 13/041 |

* cited by examiner

FIG. 1  Exemplary Apparatus for Mobile Autonomous Application of Coating
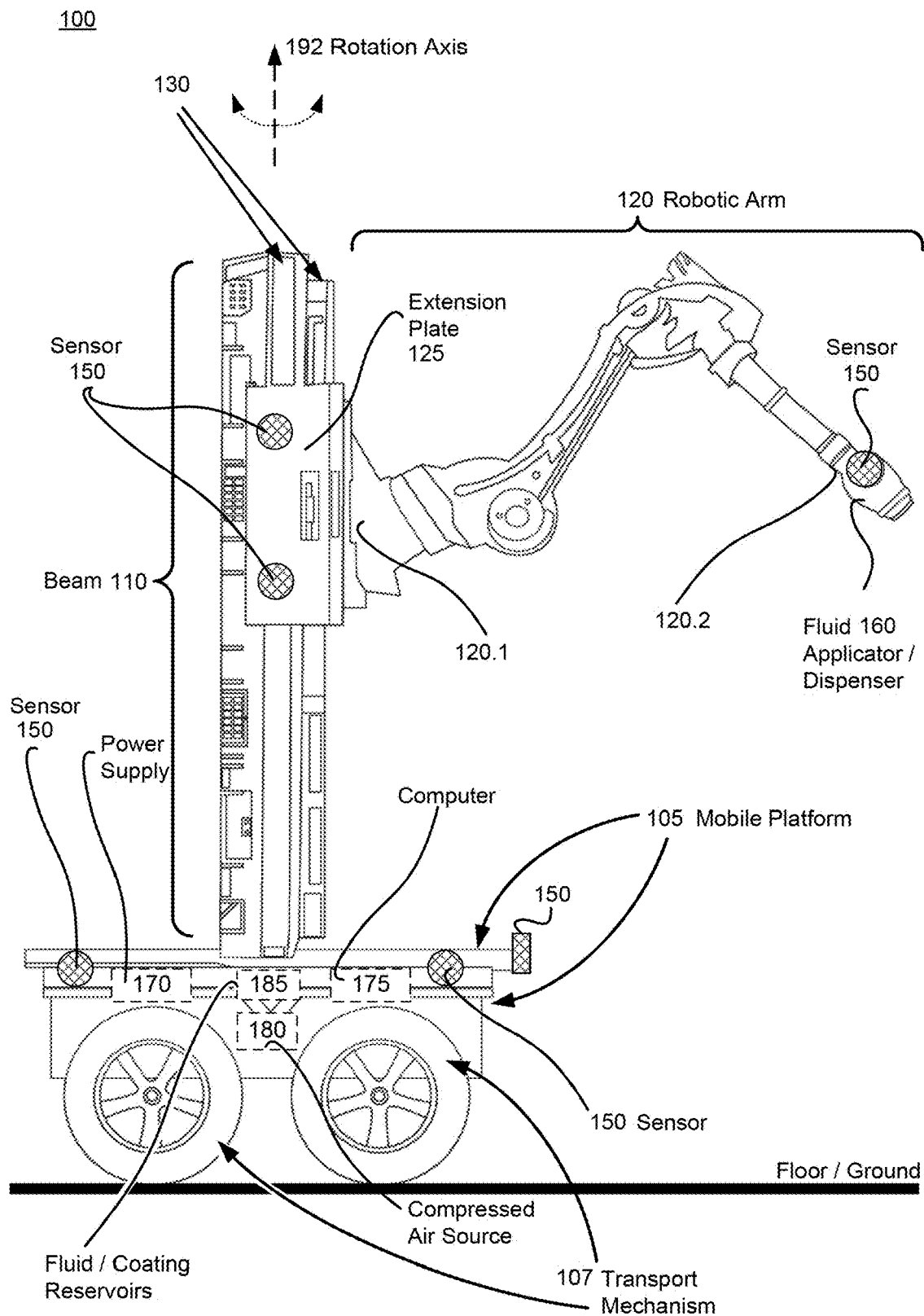

FIG. 2  Exemplary Apparatus for Mobile Autonomous Application of Coating
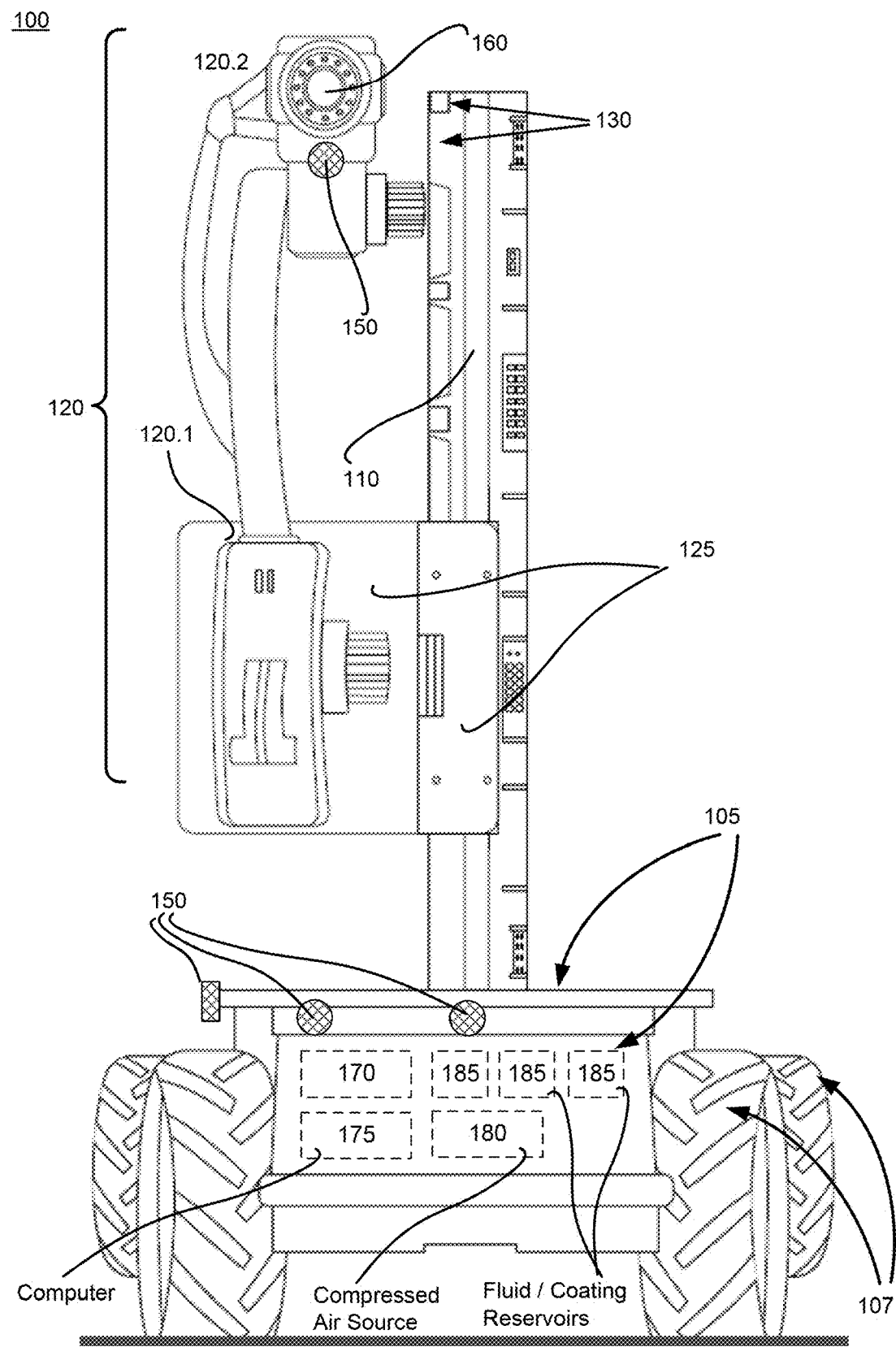

FIG. 3A  Exemplary Spray Head Assembly (Fluid Applicator)
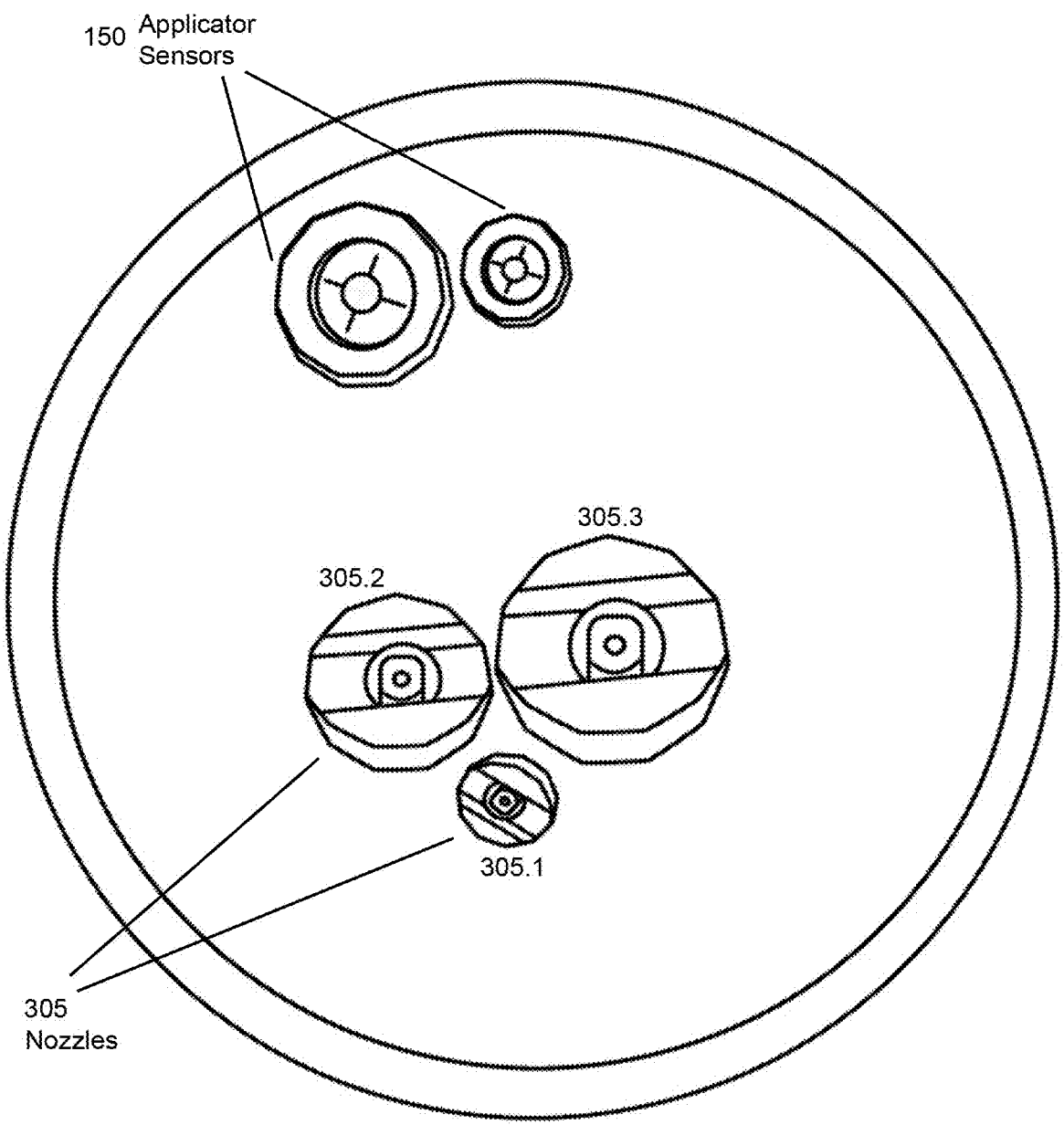

FIG. 3B   Exemplary Nozzle with Sub-Nozzles
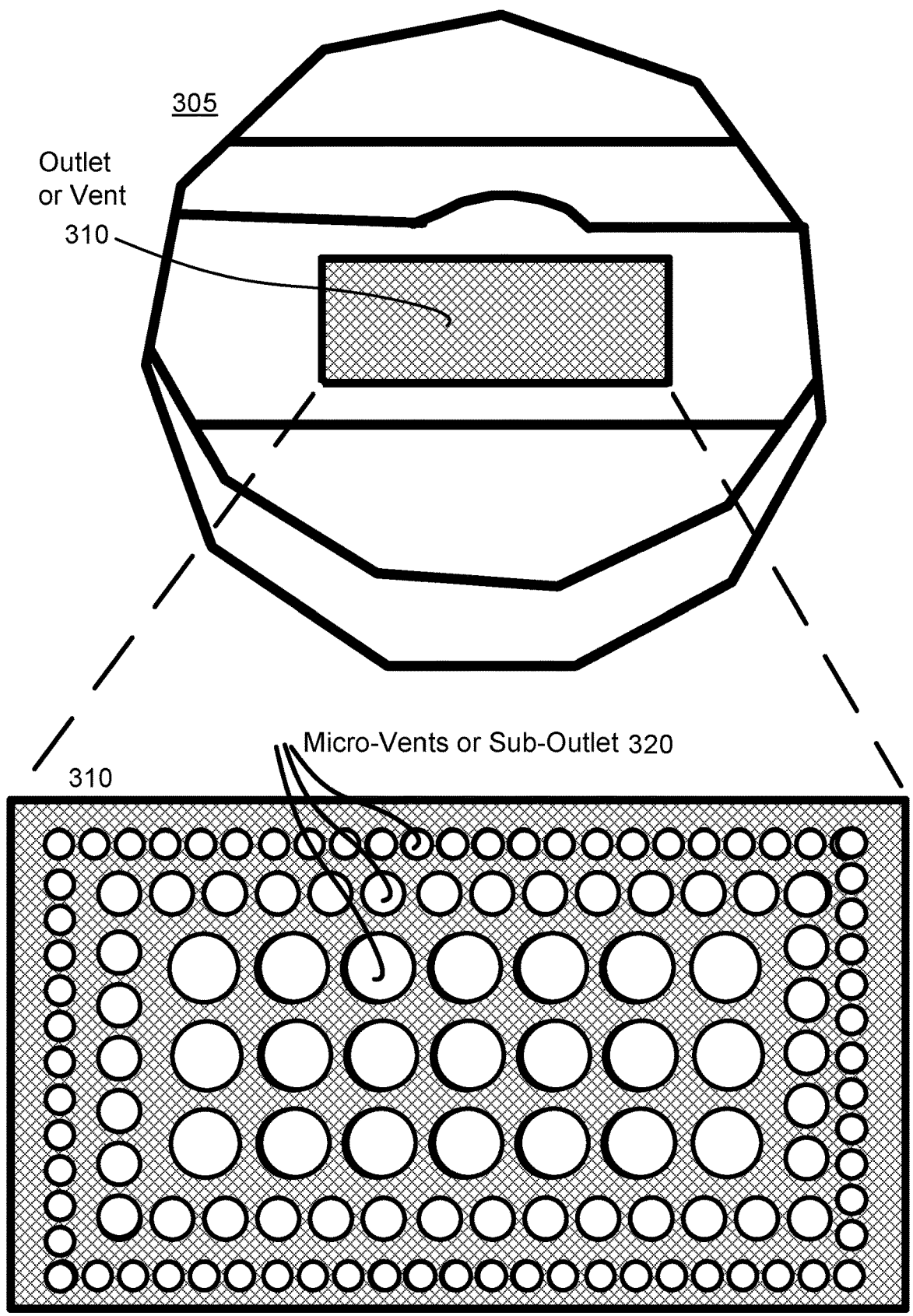

FIG. 4    Vertical Beam and Extension Beam
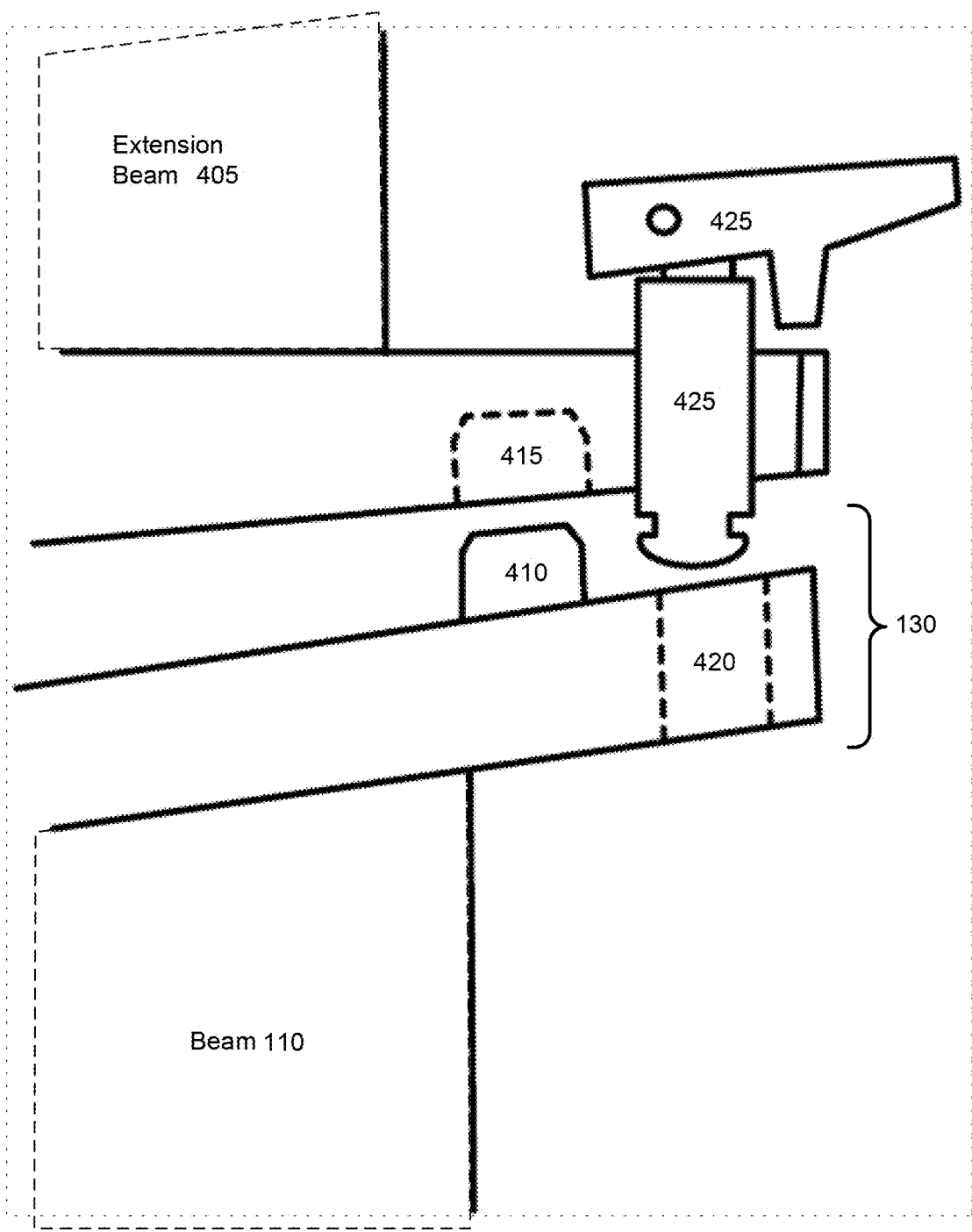

Functions

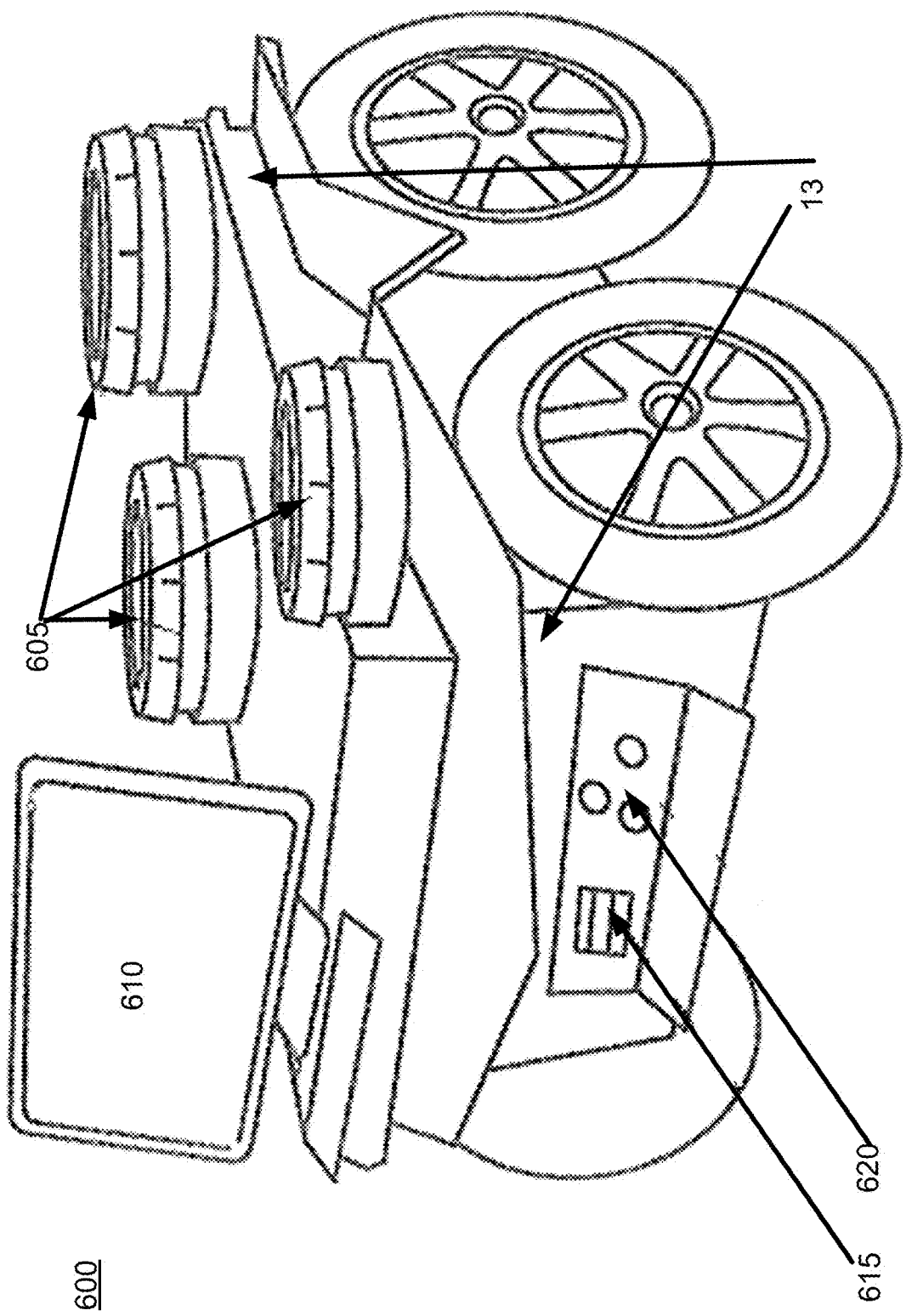
FIG. 6  Storage and Recharging Station

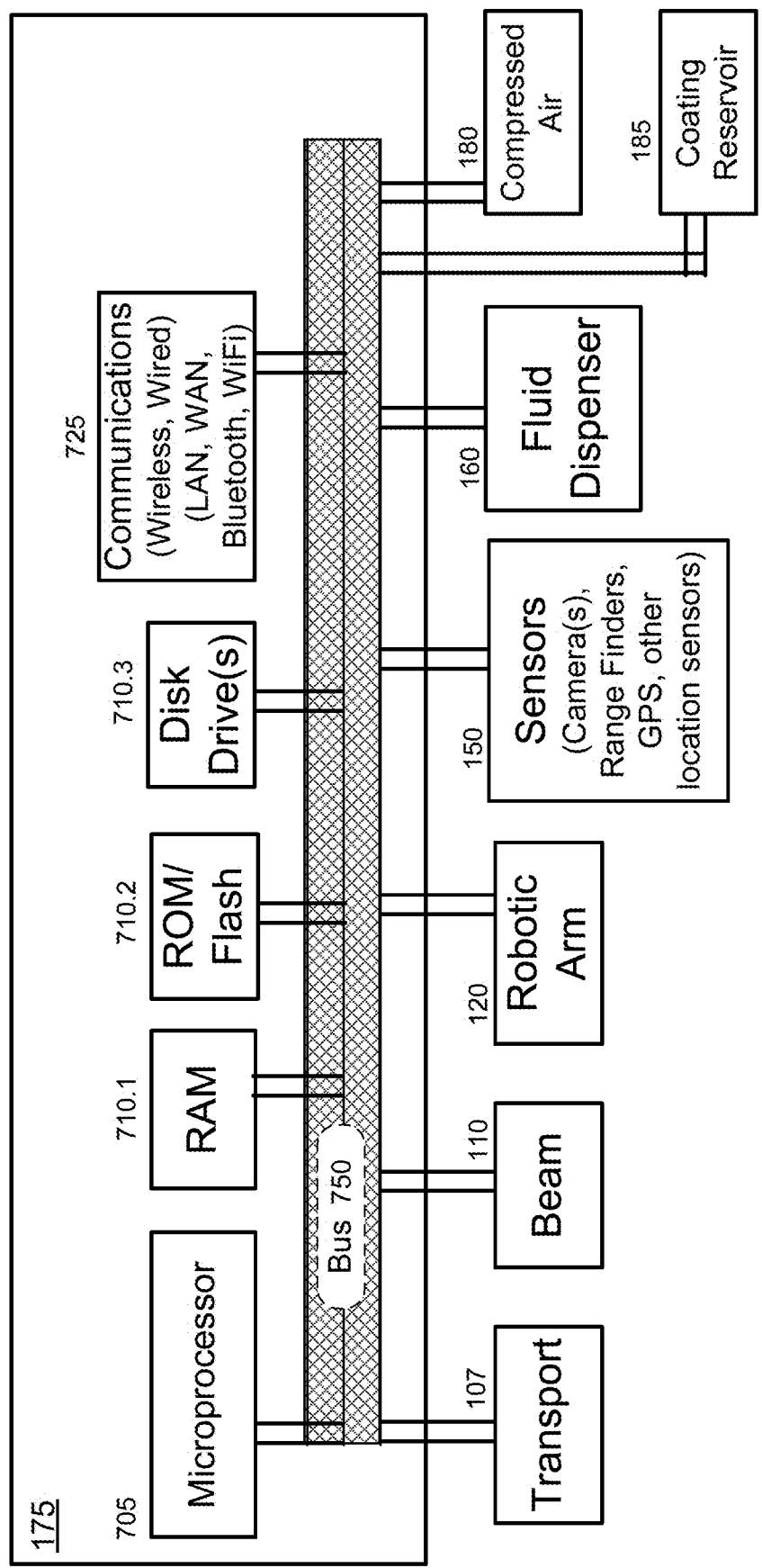
FIG. 7  Exemplary Digital Processing and Communications Unit for Mobile Autonomous Coating Apparatus

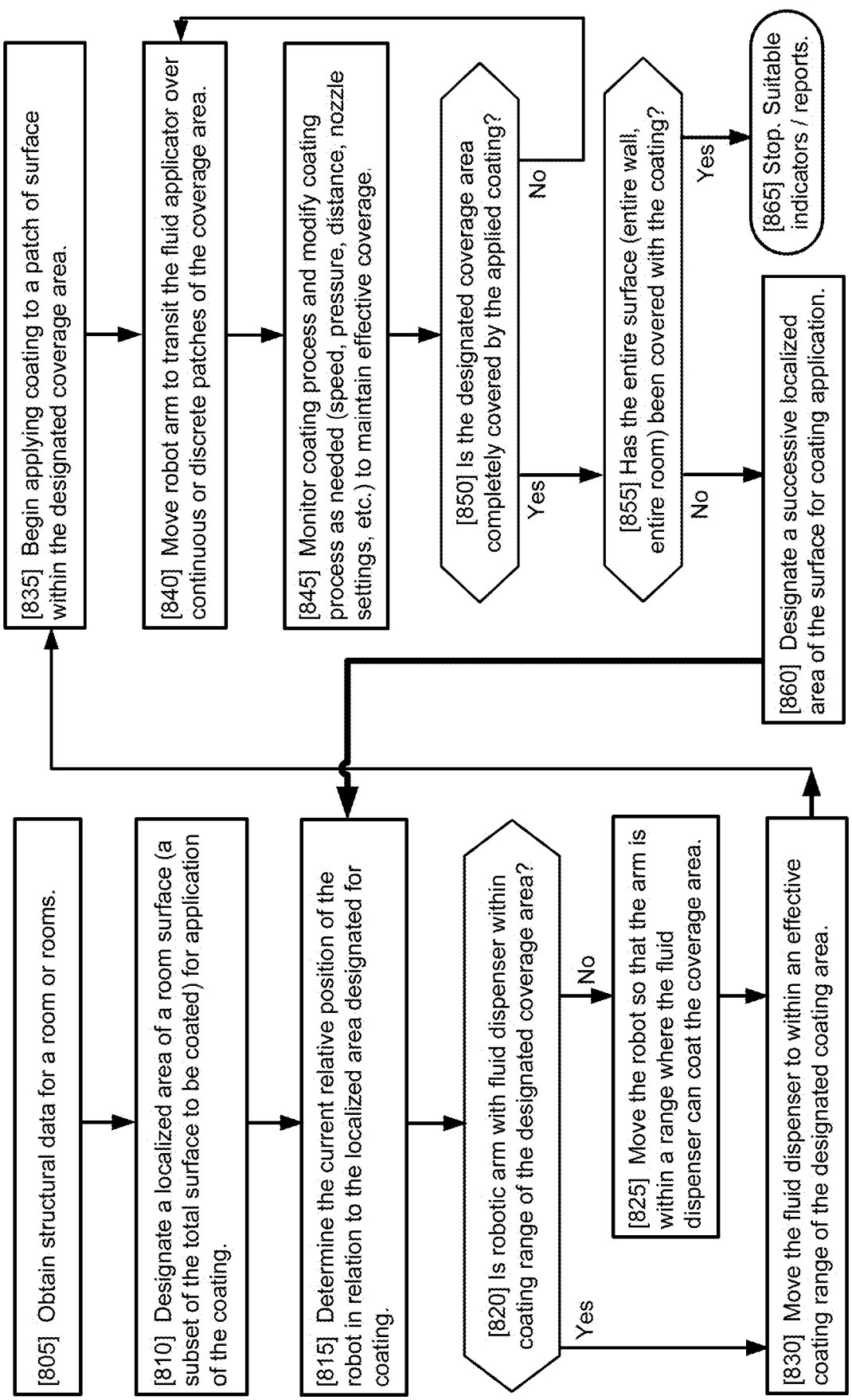

AUTONOMOUS MOBILE COATING APPLICATOR

CROSS-REFERENCE TO RELATED APPLICATIONS

This application claims the benefit of U.S. Provisional Application No. 62/633,954 filed on 22 Feb. 2018, which is hereby incorporated by reference in its entirety.

FIELD OF THE INVENTION

This disclosure is generally directed to systems and methods for robotics. More specifically, the disclosure relates to systems and methods for the autonomous and mobile application of a coating to a surface. This may include for example the mobile, autonomous painting by a robot of walls, ceiling, and even floors of structures such as buildings, for example, homes, offices, and industrial buildings. It may also include painting other surfaces such as machine surfaces.

BACKGROUND

There are currently two basic conventional systems for applying a coating, such as paint, to a surface, such as an automobile or a wall. The first conventional system, which is automated, uses an immovable painting robot to apply paint to a surface. An example of this is a painting robot in an automobile factory, where the painting robot is bolted to the floor of the factory and the automobiles are moved adjacent to the robot via an assembly line in order to be painted. Such conventional painting robots suffer several drawbacks, including being unable to paint anything that is not placed adjacent to their fixed location; for example, such a conventional robot cannot paint an immovable object or surface (e.g., a building) that is at a separate location, such as another town or across the room.

The second conventional coating system is a manual system, which is typically used to paint immovable objects and structures, such as the walls of a room in a building, or the exterior of a building. An example of this is a human hand painting the walls of a room using brushes and/or paint rollers. Manual human painting has the drawbacks of being laborious, monotonous, unhealthy (e.g., due to paint fumes), and dangerous to the painter (e.g., due to the use of ladders, scaffolding, and the like).

Thus, it is desirable to develop new devices and methods for applying a coating to a surface that alleviate the drawbacks of the existing conventional devices and methods.

SUMMARY

Accordingly, in one aspect, the present system and method embraces a robotic apparatus (a robot) to apply paint or other liquid coatings to walls or other surfaces, where the robot can autonomously move within and about the space of an environment such as a building. The robot is designed and programmed to move in such a way as to access all surfaces of the building which are to be coated, and to apply suitable coating to the surfaces. Using built-in sensing devices, the robot is programmed to detect and identify those surfaces which require the coating, and to use a robotic arm and a liquid applicator to apply the coating as specified.

In an embodiment, the robot includes a mobile platform with a transport mechanism which provides for powered movement along a floor (or similar surface, such as a sidewalk exterior to a building) so that the robot may reach all walls or other surfaces which require paint or other coatings. The robot also includes one or more mechanical arms or similar extensions which can be directed in a plurality of directions relative to the mobile platform. In an embodiment, one end of the arm is attached, directly or through intermediary mechanical elements, to the mobile platform.

In an embodiment, a second end of the arm is free-floating. One or more servo mechanisms in the robot are configured to position the second end of the arm relative to any designated area on a surface, such as an area of a wall. The servo-mechanism(s) can dynamically position the second end of the arm relative to the first end and at a dynamically adjustable position from the designated area on the wall or other surface.

In an embodiment, a fluid dispenser is attached at or near the second end of the arm, and the fluid dispenser is configured to receive a liquid coating, such as paint, from a fluid reservoir which is built into the robot. The fluid dispenser can then dispense the liquid coating for application to the surface. The fluid dispenser may for example be one or more nozzles which spray the paint, or may for example be a brush or roller which is integrated into or attached to the robot.

In an embodiment, the robot has one or more sensors, such as cameras or laser distance-sensing mechanisms, to detect one or more surface areas which are designated to receive the liquid coating. Working in conjunction with a hardware microprocessor, the sensor or sensors are configured to determine the relative position of the robot and fluid dispenser in relation to designated areas on the surface.

In an embodiment, the robot's hardware processor is programmed or programmable to receive the sensor data and determine the relative position of the apparatus in relation to designated surface areas on the walls or ceiling; control the transport mechanism and/or the servo-mechanism to determine the spatial position of the fluid dispenser relative to the designated areas on the surface; and adjust a dispensation of the liquid coating from the fluid dispenser onto the designated areas on the surface.

In an embodiment, the robot is thus structured, arranged, and configured to autonomously move about a structure, detect surface areas which require application of a coating, and to apply the liquid coating to the designated areas on the surface. As discussed further below, in an embodiment the robot is further configured to determine and control an optimal application of the liquid coating to ensure the coating is applied thoroughly, but also is only applied to desired areas, and is applied without dripping or other application flaws.

BRIEF DESCRIPTION OF THE DRAWINGS

FIG. 1 is a side view of an example of an autonomous, mobile, coating-application apparatus or robot, consistent with the principles of the invention.

FIG. 2 is a front view of an example of an autonomous, mobile, coating-application apparatus, consistent with the principles of the invention.

FIG. 3A is a front, close-up view of an example of a spray head assembly for an autonomous, mobile, coating-application apparatus, consistent with the principles of the invention.

FIG. 3B is a view of a nozzle with fluid outlet which may be on a spray head assembly, along with an exploded view of sub-nozzles.

FIG. 4 is a close-up view of an example of a vertical beam and an extension for an autonomous, mobile, coating-application apparatus, consistent with the principles of the invention.

FIG. 6 is a top perspective view of an example of a storage, recharging, and monitoring unit that interconnects with an autonomous, mobile, coating-application apparatus, consistent with the principles of the invention.

FIG. 7 is a system diagram of a computer or processing unit which is built into the autonomous, mobile, coating-application apparatus, and directs the operations of the apparatus, consistent with the principles of the invention.

FIG. 8 is a flow chart of an exemplary method for autonomously applying a liquid coating to a surface consistent with the principles of the invention.

DETAILED DESCRIPTION

Figure 5:
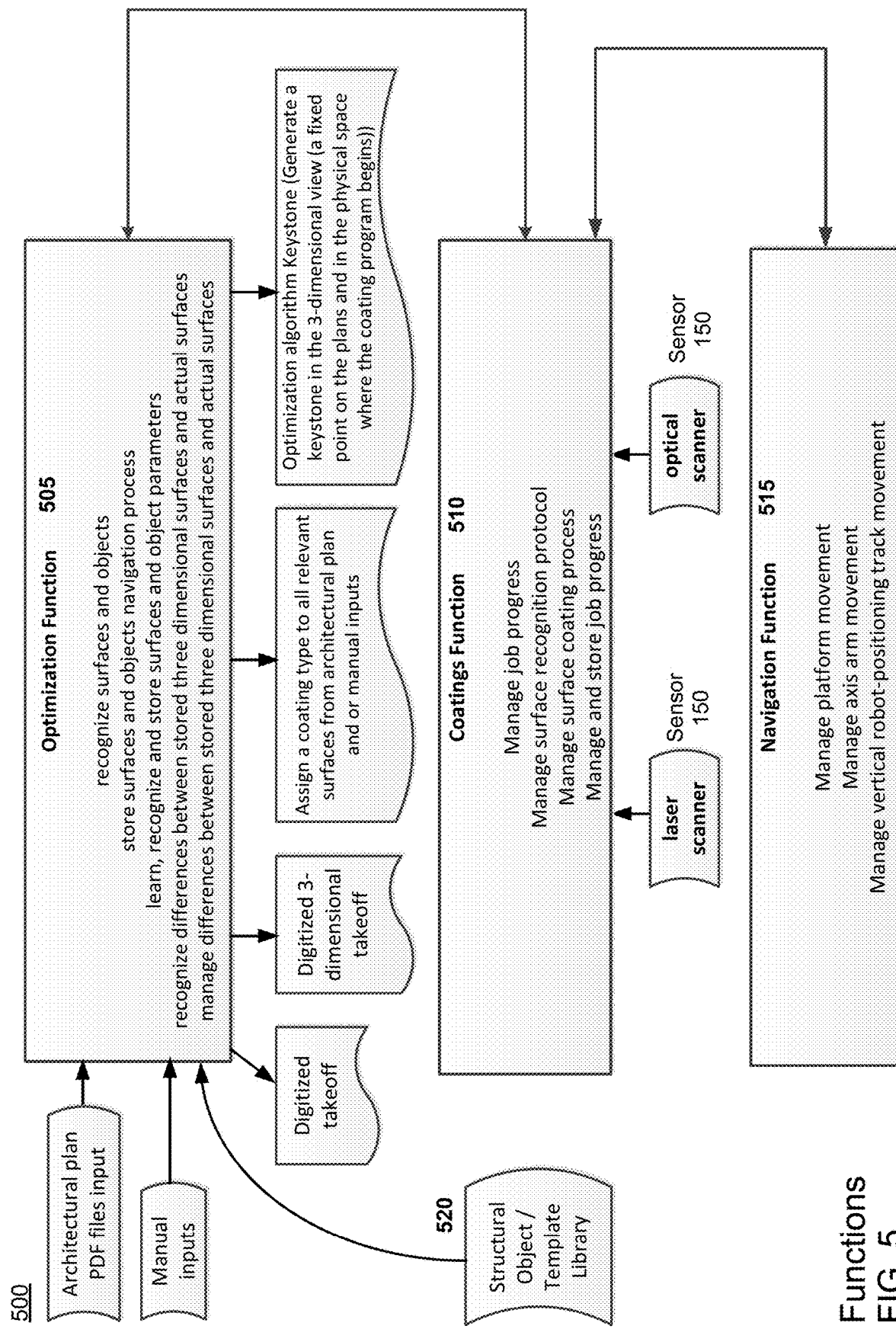
FIG. 5 is a block diagram of an example of the functional modules for an autonomous, mobile, coating-application apparatus, consistent with the principles of the invention.

Embodiments consistent with the system and method include a self-positioning apparatus 100, referred to equivalently herein as a "robot 100" that can move into an interior structural space (for example, a room) or to an exterior of a building or other structure. In an embodiment of the present system and method, the robot 100 can automatically apply a coating, such as paint, primer, lacquer, sealer, texturing liquid, or the like, to a surface of the structure (for example the walls, ceiling, doors, trim etc.) of the interior, or a surface (for example, the walls, concrete block, metal railing, steel, window trim, etc.) of the exterior of the structure, with little or no human intervention or assistance.

In an alternative embodiment, the present system and method can automatically apply other types of liquids which may be integrated into or support a structure, including for example and without limitation: fire retardants, water proofing materials, or foams which may be used for example for insulation. In an alternative embodiment, the present system and method may be used to automatically apply still other liquids intended for structural maintenance or support, such as tile grout, termite treatments, or insecticides.

Presented in detail below are exemplary embodiments of the present system and method which apply paint or other similar surface coatings. However, persons skilled in the art will recognize that the systems, elements, and methods described herein may be readily employed for the other purposes described immediately above (for example, applying water proofing, insulation foams, insecticides, etc.) and similar liquid applications.

In alternative embodiments, the present system and method may also be employed to dispense and apply coatings and materials which originate in non-liquid, semi-liquid, or transient liquid forms, for example solid materials which may be applied as fine powders, aerosols, suspensions, or solid materials which may be instantaneously heated into liquid form at the point of application to a surface.

In some embodiments or implementations, the present system and method may also include a storage, recharging, and monitoring unit that interconnects with the self-moving robot.

Exemplary Autonomous Mobile Coating Apparatus

FIGS. 1 and 2 respectively depict a side view and a front view respectively of an exemplary autonomous, mobile, coating-application apparatus 100 or autonomous mobile robot 100, consistent with the principles of the present system and method. It will be understood by persons skilled in the relevant arts that the specific placements and connections of elements shown in FIG. 1 and FIG. 2 is exemplary only, and that these elements may be combined or have relative spatial locations other than those shown in the figures. It will also be appreciated that the robot 100 will have numerous supporting elements not shown which may include for example and without limitation electrical cabling, hoses or tubes for fluid transport, electro-mechanical servo-mechanisms for various movements of various elements, data or communications ports, self-contained portable lighting, and other elements as well.

It will be understood by persons skilled in the relevant arts that the term "autonomous" as used herein, may refer to any or all of: (i) an apparatus or robot which can perform all of its necessary or expected real-time functions completely independent of human intervention; (ii) an apparatus or robot which can perform all of it's necessary or expected real-time functions completely independent of human intervention after the apparatus has been suitably programmed or configured for a task (such as painting a room or painting a house) by a human operator; or (iii) an apparatus or robot which can typically perform its necessary or expected real-time functions substantially or significantly independent of human intervention, and/or substantially or significantly independent of proximate human presence, but which may require occasional proximate presence and/or intervention (which may be local or remote) by a human operator.

As shown in the exemplary embodiments of FIGS. 1 and 2, the autonomous, mobile, coating-application apparatus 100 (or robot 100) has a mobile platform 105, which includes a transport mechanism 107 to provide locomotion and positioning ability to the mobile platform 105. The transport mechanism 107 may for example be wheels (as illustrated in the figures), mechanical "spider" legs, rollers, caterpillar treads, or tracks enabling motion of the robot 100 along a floor or the ground or other horizontal or semi-horizontal surface. In an embodiment, the transport mechanism 107 may include its own under-platform lift to elevate one or both ends of the robot 100 some distance above the around. In an embodiment, the transport mechanism may include one or more additional mechanical half-legs/half-arms to enable the platform to partly climb and lean against a wall.

Mounted on the vertical platform 105 of the robot 100 is a beam 110 which may be vertical or partly vertical, and on which is movably mounted a robotic arm 120 which is connected to the beam 110 at a first end 120.1. The robotic arm 120 has a free-floating second end 120.2.

In an embodiment the robotic arm 120 may have one segment only, or two or more segments, and may have six axes of movement, enabling the arm to be positioned so that the floating end 120.2 can be positioned arbitrarily in relation to the Platform 105, within the limits of the region of extension of the arm 120. In an alternative embodiment, the arm 120 may have more or fewer than six axes. The arm 120 may have a single segment, one segment, or two segments. In an embodiment, the arm 120 is configured and arranged with such subdivisions, joints, actuator, motors, pulleys, pistons, and/or other electromechanical units as necessary to enable versatile up/down, side-to-side, and backwards and forward movement in space, over broad angles, such that the second end 120.2 of arm 120 can navigate a circular area or other defined geometric area along a structural surface.

In an embodiment, the arm 120 may be attached to the vertical beam via an extension plate 125. The extension plate 125 moves up and down the beam 110 and acts to offset the arm 120 from the beam 110 so that the arm 120 can be placed into a greater variety of positions without striking the beam 110. In an embodiment, the extension plate 125 can move the second end 120.2 of arm 120 lower or higher. In an embodiment the control arm 120 can fold and unfold both for purposes of raising and lowering or extending second end 120.2, and for enabling the whole apparatus 100 to fit through doorways.

In an embodiment of the present system and method, at least one of the platform 105 and the beam 110 contain motors or actuators or other electro-mechanical elements (not illustrated) enabling at least one of the whole apparatus 100, the beam 110, and/or arm 120 to be rotated around about an axis 192 that is perpendicular to the floor and/or perpendicular to the horizontal surface of the platform 105 itself. This facilitates movement of the fluid applicator 160 on the arm 120 in multiple directions in a room while temporarily keeping the apparatus 100 substantially in one position on the floor or ground.

In an embodiment, the axis arm 120 includes a fluid dispenser 160 (which may also be referred to as "fluid applicator 160" or "applicator 160") positioned substantially at the second end 120.2. In an embodiment, the fluid dispenser 160 may be a single nozzle 305 (see FIG. 3A) for dispensing or applying a coating, such as paint, to a surface, such as a wall or ceiling. In an alternative embodiment, the fluid dispenser 160 may be a spray head assembly 310 with two or more nozzles 320 (see FIG. 3B) for dispensing or applying a coating, such as paint, to a surface, such as a wall or ceiling. In an alternative embodiment, the fluid dispenser 160 may a roller or brush.

The wholly or partially vertical beam 110 includes attachment points 130 for attaching an extension vertical beam (not shown), which allows the multi-axis arm 120 to reach and paint surfaces that are higher off the floor or ground than would be possible using only the beam 110.

In various embodiments, the overall dimensions of the autonomous, mobile, coating-application apparatus 100 will be less than 36 inches wide and less than 80 inches high, when viewed from the front as in FIG. 2, so as to allow the apparatus to move in and out of rooms through standard doorways.

The autonomous, mobile, coating-application apparatus 100 also includes various sensors 150 that sense or measure the distance and/or the angle between the sensor and an object or feature of the structure. Features may include, for example and without limitation, such structural elements as a wall; a ceiling; a window; trim; an electrical outlet; an electrical switch; a door; a rough-in hole; a bucket; a ladder; any opening, recess or projection into or from a surface; a lighting source (such as a ceiling lamp); transparent elements such as window panes; reflective elements such as mirrors; the texture of a surface, or the like. In various implementations, the sensors 150 may include, for example and without limitation, one or more of laser range finders, laser scanners, lidar, cameras, optical scanners, ultrasonic range finders, radar, global positioning system (GPS), WiFi, cell tower locationing elements, Bluetooth-based location sensors, and the like.

The autonomous, mobile, coating-application apparatus 100 also includes a rechargeable power supply 170 which in an embodiment is embedded inside the mobile platform 105 (indicated by dotted lines in FIGS. 1 and 2).

The autonomous, mobile, coating-application apparatus 100 also includes at least one computer, digital processing unit, microprocessor, or logic circuit 175 (which in an embodiment is embedded inside the mobile platform 105 (indicated by dotted lines in FIGS. 1 and 2). The computer 175 may be operably connected to a wired or wireless network interface (not shown), to the sensors 150 and to the movable features (e.g., the wheels 107, the extension plate 125, the arm 120, and the fluid dispenser 160).

In various implementations, the computer or logic circuit 175 is programmed with software or firmware, or is otherwise configured to perform the processes, functions, and operations described herein to position the mobile platform 105 and the arm 120 and all other moveable parts to apply a coating to a surface.

In various embodiments of the present system and method, and as described further herein in this document, the computer or logic circuit 175 is further programmed with software or firmware to optimize the individual functions of elements of the apparatus 100, and to further coordinate the operations of multiple elements (such as for example the mobile platform 105 and the arm 120) so as to optimize the overall performance of the apparatus 100.

In an embodiment, the autonomous, mobile, coating-application apparatus 100 may also include a compressed gas supply 180 which may be embedded inside the mobile platform 105, for spraying coatings. The gas employed may be, for example and without limitation: the ambient air, stored compressed air, an inert gas like nitrogen, or other suitable source of gaseous pressure. In an alternative embodiment, the apparatus 100 may include a compressor for generating compressed air.

In an embodiment, the autonomous, mobile, coating-application apparatus 100 may include one or more refillable coating reservoirs 185 (for example, paint reservoirs or primer reservoirs). In an embodiment, the refillable coating reservoirs 185 are embedded inside the mobile platform 105. In an alternative embodiment, the refillable coating reservoirs 185 may be mounted within or on other elements, such as mounted on the mobile platform 105, or mounted on or embedded within beam 110 or robotic arm 120. The refillable coating reservoir(s) 185 are connected to the fluid dispenser 160 via hoses (not shown in FIGS. 1 and 2) which may be embedded in or attached to the mobile platform 105, vertical beam 110, and arm 120). The refillable coating reservoir(s) 185 may have or be connected to computer-controlled supply valves (not shown).

The example of the mobile platform 105 that is shown includes steerable wheels 107, which are controlled by the computer to position the autonomous, mobile, coating-application apparatus 100 in order to apply a coating, such as paint, to an object, such as a wall. In other implementations of the mobile platform 105, means other than the wheels 107 may be used to provide locomotion and positioning ability to the mobile platform 105, such as caterpillar treads.

In an embodiment of the present system and method, the autonomous, mobile, coating-application apparatus 100 or robot 100 may apply a coating, such paint or a wax or polish, to the floor on which the robot 100 is situated, or to an adjacent floor. In such embodiments, the robot 100 and in particular the computer 175 may be configured to move the robot 100 so as to ensure that the mobile platform 105 does not roll over or travel across an applied liquid until the applied liquid is fully dry.

Exemplary Fluid Dispenser or Fluid Applicator

The fluid dispenser 160 of the coating apparatus 100 may take a variety of forms, including for example and without limitation one or more nozzles 305 to dispense a coating in liquid or aerosol form, one or more brushes, one or more rollers, or even one or more other types of contact application elements (which may, for example, be similar to those used in inkjet printers to imprint ink on a piece of paper).

FIG. 3A depicts an exemplary fluid dispenser 160, which may also be known as a fluid applicator 160. In particular, FIG. 3A provides a frontal view of an exemplary spray head assembly 160 for an autonomous, mobile, coating-application apparatus 100, consistent with the principles of the present system and method. As shown in the exemplary embodiment of FIG. 3A, the exemplary spray head assembly 160 includes one or more sensors 150 including for example and without limitation: an optical camera, a video camera, and a laser range finder. In an embodiment, the sensors 150 may include one or more contact or tactile sensors as well.

Also as shown in FIG. 3A, the exemplary spray head assembly 150 includes one or more spray heads 305 or nozzles 305. Shown in the figure are three spray heads, which may for example be a fine spray head 305.1 that sprays or otherwise applies a thin (for example less than one (1) inch wide) swath of a liquid coating (for example, paint or primer); a medium spray head 305.2 that sprays a medium width (for example approximately three (3) inches wide) swath of coating; and a wide spray head that sprays a wide width (for example, approximately twelve (12) or more inches wide) swath of coating. Other spray heads or nozzles may be envisioned as well, for example ones which may be considered extra-fine, spraying coating in widths which in different embodiments may vary anywhere from 0.05 inches (0.127 cm) to 0.5 inches (1.27 cm). Other spray widths may be envisioned as well.

In various implementations, the spray head assembly 160 may include more or fewer or different sensors 150 and/or more or fewer or different spray heads 305. In various embodiments, the spray heads 705 are controlled (e.g., selected) in use by the computer 175 of the apparatus 100, and the data from the sensors 150 is processed by the computer 175 of the apparatus 100 to assist in applying a coating to a surface.

In various embodiments of the present system and method, the nozzles 305 may have mechanical adjustments which may be controlled electronically (for example by computer 175) via various electromechanical actuators (not shown). The adjustments may for example alter the spatial orientation or angle of a nozzle 305 relative to the spray head 160, so as to vary the direction in which a coating such as paint transits from the spray head 160 to a surface such as a wall. In an alternative embodiment, the spray nozzle 305 may have an outlet orifice whose diameter or dilation, and/or shape, may be adjustable over some range. For example, a nozzle 305 may have an outlet orifice with a diameter adjustable from a lower bound (such as for example half an inch wide (1.27 cm)) to an upper bound (such as for example one inch wide (2.54 cm)). The width of the emitted liquid spray or aerosol may vary accordingly in real-time.

In an embodiment, a nozzle 305 may also have one or more inlet orifices with a diameter or dilation which is adjustable from a lower bound. Varying the dilation may affect the pressure, velocity, and/or spray density of the fluid or aerosol delivered from the nozzle. In an embodiment, a nozzle 305 may have also have multiple inlet orifices configured to receive fluid or coating from different reservoirs 185, so that fluid may be mixed at a single nozzle (for example, to mix paint colors or to apply a thinner to a paint or other coating).

In an embodiment, the apparatus 100 may also have more than one compressed air source in order to apply fluids from multiple reservoirs at a single nozzle.

In an embodiment, the fluid dispenser may have actuators, multiple pipes and/or tubing, and internal valves (not illustrated) to control and direct the flow of fluids or coatings from one or more fluid reservoirs 185 to any or several of the nozzles 305.

Edge Precision of Application of Coating

For many coating application purposes, including but not limited to applying paint to a wall, it is desirable to apply coatings (such as paint) with precise edges, which may equivalently be referred to as clean edges. A precise edge or clean edge, as will be generally understood, means that paint (or a similar coating) is applied to a region with a clear, crisp, well-defined delineation or demarcation at the intended border between an applied coating and surrounding areas. The coating should be applied with sufficient density for full coating coverage and substantial uniformity within the boundary of the desired area or region, up to an including the intended boundary; while at the same time a precise or "clean edge" application of a coating will leave no noticeable or observable trace of the coating beyond the desired boundary.

Such precise or clean boundaries of coating applications are particularly important between any first surface region where the coating is intended to be applied, and any immediately adjacent second region where no coating should be applied at all; or where a different coating should be applied to an adjacent area (for example, where two different paint colors are to be applied).

For example, when painting a typical room wall, a coating is typically not applied to fixtures such as electrical outlets, switches and door knobs, while a different color coating may be applied to windows, doors, or trim as compared to the wall color. Similarly, window frames may be painted while window panes are typically not painted.

Stated another way, a precise boundary means there is no overspray crossing from the intended area of application to adjacent areas which are not intended for coating application (or which are intended for coating by a different coating, such as a different color). An additional goal is to ensure that the application coating is uniform, sufficient to provide full coverage of the intended application area, and is at the same time not so thick or heavy as to result in dripping of the applied coating.

With conventional hand-painting, it is difficult to achieve a precise, clean demarcation between two immediately adjacent surface areas. This may be accomplished, with varying degrees of precision and effectiveness, by the careful use of a paintbrush, or the use of small brushes or narrow rollers. However, achieving precise clean demarcations in this way takes considerable patience, skill, care, and time. A common manual tool used by work-persons to create clean edges is the application of masking tape to a wall, trim, or fixture. The tape covers an area of the wall so that paint may be applied to an adjacent area where application is intended (via brush or roller, for example, or even manual spray painting), allowing the application coating to spill over onto the masking tape. When the masking tape is removed, a clean-edge application coating is the typical result. However, applying to tape to the wall and later removing it is itself a time consuming process.

In an embodiment, the present system and method for automated application of a coating to a surface overcomes this problem by generating a spray of paint from a nozzle 305 in such a way as to ensure that spray of coating (the liquid or aerosol) which arrives at the wall is produced in such a way as to ensure that the border or boundary between the area of application and adjacent areas is clean without the use of masking tape. Stated another way, the nozzle is configurable to dispense a fluid coating onto the surface with a substantially precise line of transition between a first surface area where the coating has been applied and a second adjacent surface area where the coating has not been applied. The present system and method accomplishes this via two integrated classes of elements:

(A) Hardware elements: in an embodiment, the nozzles 305 of the present system and method have as structural elements and/or have associated with them, a variety of mechanical elements which can adjust the degree of boundary uniformity of the applied coating at the surface of application. Some of these nozzle 305 elements or nozzle-associated elements are described elsewhere in this document, but are listed here again for completeness and ease of understanding. These elements may include, for example and without limitation:

(A1) An outlet orifice whose diameter or dilation, and/or shape, may be adjustable over some range. The width of the emitted liquid spray or aerosol may then be varied in real-time;

(A2) One or more nozzle inlet orifices with a diameter or dilation adjustable from a lower bound;

(A3) Air pressure adjustments—Servo-mechanisms, valves, pumps, motor speed controls and/or other regulators at the compressed air source 180, at or near the nozzles 305 or spray head assembly 160, or along the path between the two, which increases or decreases the air pressure which is used to force the liquid coating from a nozzle 305;

(A4) Fine-tuned distance adjustment between the nozzles and application surface, which may be accomplished for example via fine-tuned control of the position of arm 120; or via fine-tuned placement elements (servo-mechanisms) which can dynamically, mechanically adjust the position of the fluid application dispenser relative to the second end 120.2 of arm 120; or even via fine-tuned adjustment of the floor position of apparatus 100 via transport mechanism 107;

(A5) Variable speed controls on the actuators of robotic arm 120 which control the direction and speed of the horizontal and vertical movement, relative to a nearby application surface, of fluid applicator 160;

(A5) Heating or cooling elements which may vary the temperature of the liquid coating either at the point of origin (coating reservoirs) 185 or the point of application (fluid dispenser 160);

(A6) One or more reservoirs 180 for paint thinners or thickeners, and mixing elements to mix the thinners or thickeners with the application coating, to dynamically adjust the viscosity of the application coating;

(A7) Static and/or dynamic variations on nozzle structural shape, which may include for example and without limitation: nozzle vents of non-circular shapes (for example, square, rectangular, oval, flattened oval; beveled nozzle openings; nozzles with multiple micro-nozzles, so that the released liquid coating is actually emitted from multiple small sub-nozzles. (FIG. 3B provides a view of an exemplary nozzle with a rectangular coating vent or outlet, which in turn has multiple sub-nozzles, micro-nozzles, or sub-vents (as shown in the figure in the exploded view.); and (A8) Sensors 150 which can visually monitor the boundary between the coating application area and adjacent areas, enabling feedback to the apparatus 100 on nozzle performance; and also sensors (not illustrated in FIGS. 1 and 2) which may sense the measured viscosity of the paint or other coating.

(B) Algorithmic/Feedback-Based Application Control:

In an embodiment of the present system and method, the processing system 175 of the apparatus 100 may store (in, for example, the memory 710, see FIG. 7) one or more precision coating application algorithms. These algorithms may be implemented in real-time during application of a coating via the hardware microprocessor 705). The hardware processor 705 can thereby control the application of the liquid coating by elements of apparatus 100, including but not limited to fluid applicator 160. A coating application precision algorithm can ensure that the coating fluid is applied to a surface so as to ensure a clean line or spray with a clean edge, with no overspray and no dripping.

Employing the hardware elements enumerated immediately above (items (A1) to (A8), and possibly others within the scope of the present system and method, a precision coating application algorithm may produce a clean painted edge with no overspray or dripping by controlling, for example and without limitation, one or more of:

(B1) specific speed of arm movement by the arm 120, (B2) the air pressure generated by the compressed air source 180, (B3) the distance from the surface to be painted (via control of either or both of the arm 120 and the transport mechanism 107), (B4) the fluid viscosity, (B5) the dilation of inlets and/or outlets on a nozzle 305, (B6) the temperature of the coating fluid, and (B7) the shape of a shape-adjustable nozzle 305) and/or the number of micro-nozzle or sub-nozzles which are actively emitting fluid in a nozzle.

More detailed adjustments or combination adjustments may be envisioned as well, such as, for example, with a nozzle which has multiple sub-nozzles, adjusting both which sub-nozzles are used and the pressure at each sub-nozzle.

In an embodiment of the present system and method, apparatus 100 dynamically determines and adjusts (as needed), in real-time, the appropriate operations settings (such as arm movement speed, coating application air pressure, the gap (distance) between the fluid dispenser 160 and the application surface, nozzle inlet or outlet dilation, coating viscosity, etc.). These dynamic determinations and adjustments to optimize the precision of the coating process may be based on, for example and without limitation:

(i) Stored tables, functions, or other logical representations of operational settings which result in a substantially clean painted edge with no overspray or dripping. In an embodiment, these functions or tables and the specific values stored within them (or calculations which result in operational parameter values) are established and refined through product development and testing. In an embodiment these functions or logical representations may take the form of neural networks for other learning-generated representations.

(ii) Feedback systems. The apparatus 100 may employ data from sensors 150 to determine in real-time if an applied coating has a suitably clean, distinct painted edge; if the edge is blurry or indistinct beyond an allowed threshold, the apparatus may adjust operational parameters in real-time to make suitable correction.

In an embodiment, input data for assessing operational parameters may include the viscosity of the coating (either entered as a known number for a particular coating, or measured via a viscosity sensor), the room temperature, the nature or type of the existing coating on the surface, and other factors as well.

Exemplary Vertical Beam and Extension Beam

FIG. 4 is a close-up side view of a portion of an example of a vertical beam 110 and a portion of an extension beam 405 for an autonomous, mobile, coating-application apparatus 100, consistent with the principles of the present system and method. In various embodiments, the length of the vertical beam 110 may be configured to fit easily under the height of a standard door; for example, the total height of the apparatus 100 measured at the top of the vertical beam 110 is less than six feet, eight inches, such as six feet, six inches. In various embodiments, the vertical beam 110 of the apparatus 100 may be configured to connect to the extension beam 405, which may be done after the apparatus 100 enters a room through a standard doorway, as the apparatus 100 may not fit under the doorway when the extension beam 405 is attached. With the extension beam 405 attached, the apparatus 100 can move the extension plate 125 and its arm 120 (not shown in the figure) above and off of the beam 110 and onto the extension beam 405, such that the arm 120 can reach and coat objects that are higher off the ground or the floor than are reachable using the vertical beam 110 alone. In some embodiments, the extension beam 405 has a length of approximately five feet. Other lengths may be envisioned as well.

As shown in FIG. 4, in various implementations, the upper end of the vertical beam 110 may include one or more attachment points 130 that includes a fixed peg 410 and a through socket 420. In such embodiments, the lower end of the extension beam 405 may include one or more reciprocal attachment features, such as socket 415 that is configured to receive the fixed peg 410 and a securable peg 425 that is configured to fit into the through socket 420 and securely lock into place, for example via a locking mechanism 425 and/or a cotter pin (not shown) placed on a protruding lower end of the securable peg 425 after the securable peg 425 is inserted into the through socket 420. In various embodiments, there may be two attachment points 130 on the end of the vertical beam 110, as indicated in FIGS. 1 and 2.

In various embodiments, the upper end (not shown) of the extension beam 405 may have one or more attachments points similar to attachment points 130, so that another extension beam can be securely fastened to the extension beam 405. In various embodiments, the vertical beam 110 may include an extension detection sensor (not shown) that senses when the extension beam 405 is connected to the vertical beam 110 and provides that information to the computer, so that the computer can move the extension plate 125 and its arm 120 onto the extension beam 405 as needed.

Apparatus Functions

FIG. 5 is a block diagram 500 of exemplary functional modules for an autonomous, mobile, coating-application apparatus 100, consistent with the principles of the present system and method. In various embodiments, the modules shown may be implemented by the computer 175 (see FIG. 7) of the apparatus (100) in software (computer code), in firmware, or as dedicated hardware logic circuitry.

Persons skilled in the relevant arts will appreciate that the functions below are generally implemented via data processing and communications, such as that provided by computer 175. Persons skilled in the relevant arts will also appreciate that the functions below correlate data and/or initiate actions in conjunction with the other elements of apparatus 100, including for example and without limitation transports 107, sensors 150, beam 110, arm 120, dispenser 160, and other elements of apparatus 100 both described herein and others necessary for the operation of apparatus 100.

In the discussion herein below, the term "optimization function" and similar terms may be understood as equivalent to "an optimization module which implements the optimization functions described". More generally, the term function is generally interchangeable with a processing system module accessible to or stored within, and to be implemented by, the computer 175, and which implements the indicated function(s).

(C1) Optimization Functions:

The optimization function(s) 505 of the present system and method provide for improved or substantially optimal application of a liquid coating to surfaces in a given room or other environment.

Take-off: The term "take-off", as typically used in engineering, building construction and maintenance, may refer to a list of materials with quantities and types that are required to build a designed structure or item. This list is generated by analysis of a blueprint or other design document. As used herein "take-off" also refers more generally to a description of the structural elements of a room, including for example and without limitation walls, ceilings, floors, windows, doorknobs, shelving, vents and vent covers, and other elements which may interrupt or intrude upon a surface (for example, bathroom cabinets, showers, fireplaces, wall-mounted control systems, etc.). As used herein "take-off" may further refer to the absolute and/or relative placement of the structural elements in a room. As used herein, a "take-off" may further be understood as an estimate of the objects (e.g., the walls and/or the ceilings of the rooms or structures) that will be painted or otherwise coated by the autonomous, mobile, coating-application apparatus 100.

In an embodiment, the take-off may be initially based on room drawings or schematics or similar, and then may be modified in real time (if needed) by apparatus 100 based on sensor 150 measurements. In an alternative embodiment, a take-off may be determined entirely in real-time by measures made by sensors 150.

Supporting Artificial Intelligent (AI) Platform: In some embodiments, exemplary optimization functions 505 of the coating-application apparatus 100 may be implemented as an open, networked artificial intelligence platform, which is a platform that communicates with other similar platforms (e.g. with other apparatuses 100) via a network, such as the Internet or a WiFi network, to share data and rules that are learned from experience applying coatings. For example, an apparatus 100 that is located remotely (e.g., in another room, another building, or another country) and that has learned or been programmed to recognize and paint, or paint around, a new type of obstacle or feature, such as an oval-shaped window, may disseminate that information to a local apparatus 100, and to all of the networked apparatuses 100 wherever located.

Central Server: In some embodiments, shared information may be uploaded to a central, Internet-accessible server, which supplies the information to any apparatus 100 when it connects to the Internet, for example, via a wireless network. Thus, all of the networked apparatuses 100 collectively learn how to apply coatings.

In discussion below, list items are numbered for convenience of reference only, which does not necessarily reflect either of an order or priority of functions or operations. In various embodiments, the optimization function may:

(C1.1) Accept architectural plans (as PDF files or in other image formats, vector formats, or other digital representations) as a basis for a digitized take-off of a building space;

(C1.2) Accept manual inputs as a basis for a digitized take-off;

(C1.3) Create a digitized 3-dimensional view of architectural plans;

(C1.4) Create a digitized 3-dimensional view of manual inputs;

(C1.5) Via architectural plan inputs, assign a coating type to all relevant surfaces, where coating type may include color, sheen, viscosity, texture, and the like;

(C1.6) Via manual inputs, assign a coating type to all relevant surfaces, where coating type may again include color, sheen, viscosity, texture, and the like;

(C1.7) Through algorithmic programming or logic, optimize a project to minimize time, material and energy, which may include selecting arm 120 movement, arm 120 speed, arm/painting pattern, spray nozzle 305 selection, compressed air pressure for application coating, floor movement schema or pattern, etc.;

(C1.8) Through algorithmic programming or logic, generate a keystone in the 3-dimensional view, the "keystone" being fixed point on the plans and in the physical space where the coating operations begin;

(C1.9) Through sensor 150 input and programming or logic, recognize surfaces and objects;

(C1.10) Through sensor 150 input and programming or logic: store surfaces and objects navigation process. In various embodiments, the navigation process data may include rules and/or data that describes what to do after an object or surface is recognized, including for example and without limitation painting an object or surface, painting around the object or surface, the procedure(s) for painting the object or surface, the procedure(s) for painting around the object or surface, and stopping and issuing an alert to an operator;

(C1.11) Through sensor 150 input and programming or logic, learn, recognize and store surfaces and object parameters. In various implementations, this may include data describing what the apparatus 100 expects to detect while in operation, for example, according to a 3D model generated from an architectural plan of the building or room to be painted;

(C1.12) Programmatically or logically recognize differences between stored three dimensional surfaces and actual surfaces. In various implementations, this may include recognizing any differences between what the apparatus 100 expects to detect, (e.g., according to a 3D model generated from an architectural plan) and what the apparatus 100 actually detects with its sensors 150; and (C1.13) Programmatically or logically manage differences between stored three dimensional surfaces and actual surfaces. In various implementations, this may include recognizing that minor differences that are within predefined tolerances, (e.g. a difference of less than 3 inches in the length of a 20 foot wall), should be processed normally, as well as recognizing that differences that are outside of the predefined tolerances (e.g. a difference of 10% (2 feet) in the length of a 20 foot wall) should be processed as exceptions or errors.

(C2) Coatings Function

In some embodiments, the coatings function(s) 510 may be implemented as an open, networked artificial intelligence platform, as already described above. In various embodiments, the coatings function may:

(C2.1) Communicate with the optimization function to:

(C2.2.1) Manage job progress, which may include for example and without limitation measuring job progress, such as creating, storing, and updating data that indicates how much of wall, room, etc. has been coated (for example, room completed; 75% of the present wall completed; 2 feet laterally and 4 feet vertically completed on the present wall, etc.); and (C2.2.2) Managing one or more surface recognition protocols, which may include identifying what a surface is and then determining how to coat it based on what it is, and then implementing the coating using the arm 120, etc.;

(C2.3) Communicate with sensors 150, such as an optical scanner, a laser scanner, a rangefinder, or the like;

(C2.4) Communicate with the navigation function, which may include finding out the current location of the apparatus 100 from the navigation function, for example in terms of GPS coordinates or in terms to relative distance(s) from structural features such as walls, doors, corners, etc., and which may employ communication with suitable cameras 150, other optical sensors 150, laser sensors 150, lidar 150, and location sensors 150;

(C2.5) Manage the surface coating process, including tracking coordinates or areas of specific surfaces and surface elements which have been covered, as well as those which remain to be covered; and (C2.6) Manage and store the overall job progress, which may include for example and without limitation tracking the process of coating multiple rooms in a structure.

(C3) Navigation Function

In some embodiments, the navigation function 515 may be implemented as an open, networked artificial intelligence platform, as already described above. In various embodiments, the navigation function may:

(C3.1) Communicate with the Coatings function 510 to:

(C3.2) Manage platform movement, which may include steering and rotating the wheels 107 or other transport 107;

(C3.3) Manage axis arm 120 movement, which may include positioning the arm 120 and the extension plate 125 prior to and during a coating operation (e.g., a paint spraying operation);

(C3.4) Manage vertical robot-positioning track movement so as to change the vertical height of the arm 120; and (C3.5) Communicate with the sensors 150, such as an optical scanner, a laser scanner, or the like.

Exemplary Computer or Data Processing System

FIG. 7 illustrates some elements of an exemplary onboard data processing system 175 or computer 175 which may be employed in an exemplary mobile autonomous coating apparatus or robot 100 according to the present system and method. Persons skilled in the relevant arts will appreciate that the elements shown are representative elements of such computer systems 175, and that particular data processing systems 175 may employ only some of the elements shown, or may employ variations on the elements shown, or may utilize additional elements not shown.

In an embodiment, a processing system 175 according to the present disclosure includes a processor or microprocessor 705; volatile memory 710.1 such as random access memory (RAM) for dynamic data processing and program storage; static or non-volatile memory 710.2 such a ROM/Flash memory for either or both of maintaining an operating system and low-level hardware support code, and also for long-term data storage; and a hard disk drive 710.3 or hard drive alternatives such as solid state drives (SSD) or flash drives for non-volatile, long-term but dynamic storage of very large quantities of data.

In an embodiment, the processing system 175 may also include a wired communications system 725 (such as USB or Ethernet), allowing the coating apparatus 100 to be controlled via wiring or cable from local ports in a room. In an embodiment, the processing system 175 may also include a wireless communication system 725 such as WiFi or BlueTooth. The communication system 725 may enable the processing system 175 to communicate with a wireless network, such as a cellular network (e.g., a GSM network, a CDMA network, or an LIE network), a local area network (LAN), and/or an ad hoc network.

The communications system 725 enables the processing system 175 to communicate with other remote processing systems via either or both of local communications networks and large-scale networks such as the Internet; and also to store and retrieve data from distributed cloud storage (not illustrated). The communication system 725 may also enable the coating apparatus 100 to be monitored and/or have its real-time operations modified or fine-tuned, by a human operator via remote control (which may for example be another computer, or an app on a cell phone).

In some embodiments, the processing system 175 may also include a variety of user-interface elements not illustrated in FIG. 7, some or all of which may be mounted flush with or on an exterior surface of the apparatus 100. These user interface elements may include audio elements such as a speaker and/or microphone; a display screen, which may be a touch-screen display, for presentation of data and graphics to persons; and a keyboard for entry of text, numbers, punctuation, and control actions. In some embodiments, a touch-screen display may provide dual functionality as a keyboard. The processing system 175 may also have additional input controls such as a mouse or touchpad (not shown in the figure). The general use of such user-interface elements to obtain data locally from a human operator and provide data locally to a human operator is well-known in the art and is not described further herein.

In some embodiments, the hardware microprocessor 705 is communicatively coupled to the memory 710.1 and other storage 710.2, 710.3 and to communication system 725 via one or more system buses 750. The bus(es) 750 may include various bus-mastering control chips (not illustrated). Various embodiments of system bus architecture such as PCI, SCSI, ACP, EIDE, HyperTransport, and InfiniBand, well known in the art or others to be developed; these may provide for efficient data transfer and/or communication between the components (705, 710.1, 710.2, 710.3, 725) of processing system 175 and may be employed in exemplary embodiments in accordance with the present disclosure.

Typically, the hardware processor 705 is configured to execute instructions and to carry out operations associated with the processing system 175 and more generally with the mobile coating apparatus or robot 100. For example, using instructions retrieved from memory 710.1, 710.2, 710.3 (e.g., a memory block), microprocessor 705 may control the reception and manipulation of input and output data between components of the processing system 175 and more generally with elements of the mobile apparatus 100 (such as transport 107, beam 110, arm 120, sensors 150, fluid dispenser 160, compressed air unit 180, and coating reservoir 185).

The microprocessor 705 typically operates with an operating system (such as for example MS Windows, Apple iOS, Linux, Android, or a propriety operating system) to execute computer code and to import and generate data. The operating system, other computer code, and data may reside within the memory 710.1, ROM 710.2, and hard disk storage 710.3 that is operatively coupled to the microprocessor 705.

The operating system, other computer code, and data may reside in volatile memory 710.1 which is permanently built into the processing system 175 or installed in a slot on processing system 175; or on one or more removable, non-transitory storage medium (not illustrated) that is loaded or installed onto the processing system 175 when needed via external ports on the robot 100 (not illustrated in FIGS. 1 and 2). Exemplary removable non-transitory storage media include CD ROM, PC-CARD, memory card, flash drives, floppy disks, and/or magnetic tape, and/or such other data and code storage media as may be developed in the future.

The operating system, other computer code, and data may also be hard-coded into the processing system 175 either as dedicated logic within processor 705 or as non-volatile memory known as firmware 710.2.

In an embodiment, the instructions and data employed by the processing system 175 may be organized into one or more modules, as discussed above in conjunction with FIG. 5. Such modules may be implemented, in whole or in part, as one or more of dedicated logic in processor 705; firmware 710.2; dedicated, specialized processors (represented or subsumed in FIG. 1 by processor 705); and/or volatile memory 710.1. Software modules may be dynamically loaded and unloaded (for example, from disk drives 710.3) as needed to perform specialized tasks and operations.

Exemplary Operations

The operations described below are generally performed by the various electromechanical elements (107, 110, 120, 150, 160, 170, 180, 185) in conjunction with control commands and control analysis from computer 175.

Blueprints and Take-offs: In various embodiments, the autonomous, mobile, coating-application apparatus 100 may accept file inputs (e.g., electronic blueprints or electronic architectural plans) and/or manual inputs describing the object to be painted as the basis for the generation of a 3-dimensional take-off. The apparatus 100 may use data from construction blueprints, either manually or electronically entered, to "take-off" the information it will need from those blueprints in order to perform a coating job. Examples of possible take-offs include the number of walls to be painted, the dimension of each wall, painting-relevant measurements including for example and without limitation the height of wall or other structural element (such as windows and doors and outlets, and the like), the width of wall or other structural element, the amount of paint needed (which may be based on the area of the structural element), and the counts and locations of structural elements or items which interrupt the wall surfaces.

As understood in this document, then, a take-off may be viewed as a complete digital representation of a room or building, including walls, doors, openings in walls, room fixtures (such as windows, electrical outlets, etc.)

An architectural plan or blueprint provides a 2D description of room(s) or structure(s) to be painted. The computer 175 of apparatus 100 converts this 2D input into a 3D model by incorporating height or elevation information; for example, how high a wall is. The computer 175 of the apparatus 100 uses the 3D model to calculate its current location, the next location to move to, where windows are, where electrical outlets are, where to apply paint, etc., and then directs transport 107, beam 110, arm 120, and associated elements, servo-mechanisms, and actuators to move and act accordingly.

In some embodiments, the computer 175 of apparatus 100 may generate a 3-dimensional take-off using its sensors 150 to take actual measurements of the object to be painted, such as a room or an exterior wall. The measurements produce a data structure (for example, a point-cloud) which is then used to generate the 3-dimensional take-off.

As understood in this document, a "digital drawing" or a "digital map" of a structure is an inclusive term which may refer broadly to any or all of a take-off; architectural plans in digital form; architectural drawings in digital form; a point cloud of a room, a building, a surface of a building, a door or window, a fixture within a building; or any similar digital, computer-parseable representation of a room or structure of a room.

Surface: As understood in this document, a "surface" may refer to a particular extended structural element, such as a well, ceiling or floor; but the term "surface" may, in context, also be understood to refer more broadly to any or all of:

(a) other structural elements to which a coating may be applied, such as doors, windows, or fixtures;

(b) an extended structural elements such as a wall, ceiling or floor, and also to both other structure elements such as fixtures to which a coating will be applied, and also to embedded or attached structure elements for which it is specified that the coating should not be applied; and/or (c) an entirety of multiple surface areas to be covered in course of a complete coating job, such as multiple walls and the ceiling of a room, or even multiple walls of multiple rooms.

Coatings: In various embodiments, the apparatus 100 may accept file and/or manual inputs to assign a coatings type to the objects in the three-dimensional architectural plan take-off. For example, an operator or user may specify that the apparatus 100 use the coating from a first reservoir (e.g. blue paint) to coat the walls of a room, and use the coating from a second reservoir (e.g. red paint) to coat the ceiling of the room. A primer may be indicated as well.

In an embodiment of the present system and methods, artificial intelligence routines implemented by computer 175 may select colors of paints (or fine-tune the tone or brightness of paints) to be applied to surfaces, based on contextual factors (such as room size, room illumination, and other factors), possibly informed by individualized selections of an owner or occupant of a structure.

Operational and Resource Optimizations: In various embodiments, the apparatus 100 may algorithmically optimize inputs to minimize material, time and energy used to paint an object or set of objects. The apparatus 100 may determine the best place to start painting an object, such as each wall of a room, based on the capabilities of the fluid dispenser 160 (such as a spray head assembly 160), which may for example have the capability to spray two, three, or more different widths of paint, and based on the area of the surface (e.g. 500 square feet), the possible positions of the apparatus 100, and the number of features associated with the surface, such as the number of doors, windows, outlets, etc. in a wall.

In various embodiments, the apparatus 100 may also determine, using the 3D plan, the keystone, which is the best or optimal place to start painting a surface, or an object or set of objects; and also the order of painting each object. In an embodiment, this determination is based on parameters such as the number of rooms or walls to paint; dimensions and features of each room or wall; coating for each room or wall (e.g. paint color), and the like, so as to minimize the time the robot apparatus 100 spends moving between locations, minimize the time to change back and forth between colors, minimize the need to add and remove extensions to the vertical beam 110, minimize paint usage, minimize power usage etc. In an embodiment, the determination of the keystone and path of application coating may be constrained by various user-controllable parameters. For example, parameters may be set to indicate that certain surfaces are not to be coated (for example, an area which may be designated to later receive wall paper), or that certain sections of the floor are to be avoided by the robot 100.

The apparatus 100 uses its sensors 150 and software to recognize surfaces, objects, features, obstacles and environments, and to properly position itself and its fluid dispenser 160 to coat designated objects or surfaces. For example, the apparatus 100 uses its sensors 150 and software to position its fluid dispenser 160 near the keystone location at the start of a painting job.

Structural Element Identification and Responses: In various embodiments, the coating apparatus 100 may use template matching, image transformation, scale-invariant feature transforms, and other image matching techniques to compare a visual field of view obtained by sensors 150 (or a point-cloud generated from the visual field of view) with stored data representations of structural features and obstacles. (A point-cloud is a three-dimensional model of the space generated via laser beam or via multiple images, or sensors, or lidar, or stereo video, or sonic.)

The coating apparatus may have and/or build a structural object library 520 of known structural features and obstacles, including for example and without limitation: windows, electrical outlets, electrical switches, doors, rough-in holes, inside corners, outside corners, etc. The coating apparatus 100 may use the stored digital representations of these known features and obstacles (which representations may be or include sensor data stored in the structural object library 520) to identify or recognize, in real-time, the real-life surfaces, objects, features, obstacles and environments that the sensors 150 are currently detecting. The identification may be performed according to rules which entail matching a pattern that is stored in the library 520 to patterns detected via sensors.

In various implementations, the apparatus 100 may also compare the physical environment that its sensors 150 are detecting to a 3D model created from an architectural plan or blueprint to help recognize real-world things by their intended location according to the 3D model; and further to identify disparities between the real-world and the 3D model, such as additional, moved, or missing objects (e.g., missing outlets).

The structural object library 520 may store sample images of features and obstacles, or store various mathematical templates (such as vector representations or point-clouds) of features and obstacles, or other abstract representations of features and obstacles. In an embodiment, various visual pattern matching techniques may be employed to match areas observed by sensors 150 with candidates in the template library 520.

Coating Application: The apparatus 100 also uses its sensors 150 and software to navigate multiple surfaces, objects and environments and to apply a coating (e.g., paint) to multiple locations and surfaces. For example, after recognizing that the object in the wall in front of the apparatus 100 is an electrical outlet, the apparatus 100 may access data or rules or rule sets that tell the apparatus 100 how to navigate that object during a coating operation. For example, if the object is recognized as an outlet, then the apparatus 100 may access data that directs the apparatus 100 to not to paint over the object. For another example, if the object is recognized as an inside corner, then the apparatus 100 may access data or rules that directs the apparatus 100 to paint the two sides of the corner from two different perpendicular directions.

In various embodiments, the data that directs the apparatus 100 how to navigate and paint various objects may be implemented as a set of rules. In various embodiments, the rules may include data for recognizing, in addition to objects, various types of surfaces, such as wood, dry wall, plaster, brick, stucco, etc. and directives for how to apply a coating to them, such as single coat, double overlap, triple overlap, thatch, etc.

The apparatus 100 also uses its sensors 150 and computer to manage and position the multiple axis arm 120 and wheels 107 to maneuver the apparatus 100, and in particular the fluid dispenser 160, to a calculated location in order to coat a surface, and to manage coating dispensing tools (such as the nozzles 305) to apply a coating.

Job Progress Tracking: In various embodiments, the apparatus 100 may store parameters on job progress. For example, the apparatus 100 may store parameters indicating which walls have been painted to completion, which ceilings have been painted to completion, which rooms have been painted to completion, etc. Similarly, the apparatus 100 may store parameters indicating which objects have been partially coated (e.g., painted) and where the painting left off. The apparatus 100 may use the stored job parameters to avoid painting an object twice and/or to resume painting where it last left off, in case of an interruption due to factors such as running out of paint or power, malfunction, being manually stopped at the end of a work shift, etc.

Referring again to FIGS. 1 and 2, various embodiments of the autonomous, mobile, coating-application apparatus 100 may have the ability to coat a specific area in front of the apparatus 100 when the apparatus is stationary, such as for example a rectangular area that measure 4 feet wide and 10 feet tall, which can be reached by the apparatus 100 without moving the mobile platform 105. This area may dictated by the dimensions and configuration of the apparatus 100, which affect how far the arm 120 can reach while still maintaining stability of the apparatus 100.

Exemplary Method

Presented above are numerous exemplary hardware elements, operational procedures, and software processes which are associated with the autonomous mobile coating applicator 100, or robot 100, of the present system and method. Presented here is an exemplary method 800 for operations of the robot 100, the method 800 employing selected, exemplary elements and operations already discussed in detail above. The method 800, described here and shown in the flowchart of FIG. 8, is exemplary only.

Persons skilled in the relevant arts will appreciate that the exemplary method 800 is not intended to describe, and does not describe, every possible operational aspect of the robot 100, and further omits significant details and subsidiary operations which may be associated with the method steps which are taught here. The exemplary method 800 only illustrates some steps or operations which together, and when embodied for example in computer code which may run on the computer 175, may enable the microprocessor 705 to direct other hardware elements of the robot 100 to autonomously apply a liquid coating to a designated surface or surfaces of a structure.

The method 800 is an exemplary method which may be employed by an autonomous mobile coating robot 100 to apply a coating to a surface of a structure. The steps discussed below are exemplary only, and in different embodiment different steps or additional steps may be employed, or some steps may be omitted, consistent with the scope and spirit of the present system and method.

The method begins with step 805.

In step 805, the method obtains structural data for a room or rooms within a building. The structural data may include the location, sizes, and positions of surfaces, such as walls and ceilings and even floors, and may also include the locations, sizes, and positions of other structural elements such as windows, electrical outlets, lighting fixtures, light switches, air vents, and other structural elements which may interrupt or be embedded within a surface. The method 800 stores the structural data in the memory 710.

The structural data may also include relevant data for floor-placed objects such as built-in cabinets or toilets, so the mobile robot 100 can navigate around such elements. In an alternative embodiment, the robot 100 may detect such floor-placed objects via its sensors 150.

As described elsewhere in this document, the structural data may be obtained from input data such as building blueprints or input digital representations of the structure; or the structural data may be obtained by analyzing (via the computer 175) the data obtained from the robot's visual sensors 150 and other sensors 150.

The structural data may also include data to indicate which coating(s) (for example, which paint colors) are to be applied to which surface areas and other structural elements of the room.

In step 810 the method determines a first designated area of the surface for initial application of the liquid coating, based on either or both of (i) the structural data which is now stored in the memory 710 of the robot 100 and (ii) data from the robot's sensors 150. The determination may also be based in part on algorithms and optimization functions 505 stored in the memory 710 and processed by microprocessor 705 which help determine an optimum first designated area. In an embodiment, an exemplary algorithm might determine that coating application should begin at or near an entrance to a room where the robot 100 enters the room, then proceed around the room to finish up at or near the same entrance, where the robot 100 can then exit the room. Other algorithms may be envisioned as well.

In an embodiment of the present system and method, the size and scope (for example, the height and width, or the radius from a central point) of the localized area may be established so as to ensure that the entire localized area can be covered with the liquid coating solely by movement of the robotic arm 120, so that the localized area can be covered without requiring movement of the platform 105 along the floor.

It will be understood that in a typical case, the localized area so designated represents only a part or a portion of the total surface to be covered, so that movement of the robot 100 along with floor will be required to cover the entire surface (for example, a wall or several rooms of an entire room).

In step 815, the robot 100 determines the relative position of the apparatus in relation to the designated area on the surface, which may be based both on environmental data receives from sensors 150 and based on the robot's own self-movement tracking data, which is stored in memory 710.

In step 820 the robot determines if its robotic arm 120 with the fluid dispenser 160 is moveable to within a coating range of the designated coverage area on the surface. In an embodiment this determination may be based on the location of the designated coverage area and on the location of the robot 100; and also based on the robot's internally stored data concerning the movement range of the robotic arm 120, the resulting maximum extension range of fluid dispenser 160, and the maximum allowable distance between the fluid dispenser 160 and the surface for effective application of the coating.

If the robot determines that the arm 120 is not within the coating range of the designated area, the method proceeds with step 825. If the robot determines that the arm 120 is within the coating range of the designated area, the method proceeds with step 830.

In step 825, if the robot has determined in step 820 that the arm 120 is not within a coating range of the designated area, the robot moves via its mobile platform 105, and specifically via the transport mechanism 107, to position the arm 120 with its fluid dispenser 160 within the coating range of the designated coating area. The method then proceeds to step 830.

In step 830, the robotic arm 120 and associated servomechanisms move the fluid dispenser 160 of the robotic arm 120 into an effective coating range of the designated coating area. This may include moving the entire arm 120 up or down along beam 110, lengthening or shortening the extension of arm 120, and/or changing the angle of extension of arm 120 in relation to platform 105. (An effective coating range is a distance between the fluid dispenser 160 and the surface which is sufficiently close to the surface that the applied liquid can be sprayed onto the surface, and provide adequate coverage of at least a localized patch of the surface, within a reasonable and practical period of application time—for example, on the order of a few seconds, so that a patch of surface can be adequately coated in one to ten seconds. In some embodiments a longer or shorter period of time to coat a patch of wall may be suitable or required.)

In step 835, the liquid coating is applied to an initial region or portion, referred to here as a "patch", of the designated coating area on the surface by fluid dispenser 160, aided by appropriate movements of robotic arm 120 to cover the entire designated coating area.

In step 840, the method moves the robot arm 120 so as to ensure that the fluid applicator traverses the designated coating area in a direction or in directions which are substantially parallel to the designated area of the surface. At the same time, the fluid applicator 160 continues to apply a stream of fluid to the surface. The fluid applicator continues to traverse the designated coating area until the entire designated coating area is coated by the fluid applicator.

In an embodiment of the present system and method, step 845 occurs at substantially the same time or in parallel with step 840. In step 845, the method employs sensors 150 to monitor the coating as it is applied, and the coating process may be continuously, dynamically modified as needed to ensure effective coating.

Effective coating may include, for example and without limitation, ensuring full coverage by the coating fluid (with no regions or areas where an older coating "peeks" through), ensuring no dripping, and ensuring that the edges of the coating are precise and clean (as discussed above in conjunction with FIGS. 3A and 3B, and elsewhere in this document). The coating process may adjust the speed of arm motion, the coating pressure, the distance of fluid applicator 160 from the surface, the shape or diameter of nozzle(s) 305 and/or nozzle vents 310, and other operational parameters as needed to ensure effective coating.

In an embodiment of the present system and method, step 850 may occur at substantially the same time or in parallel with steps 840 and 845. In step 850, the method determines if the designated coverage area has been completely covered by the coating. This may be determined by (i) tracking of the coating Process in the memory 710; by (ii) monitoring the application area of the surface via sensors 150; and/or (iii) by other means as well. If the designated coverage area has not been completely covered, the method continues with step 840 (further arm transit and further application of coating) and with step 845 (monitoring and modifying the coating process). If the designated coverage area has been completely covered, the method continues with step 855.

In step 855, the method determines if the entire surface to be covered (for example, the entire wall or an entire room) has been completely covered by the coating. This may again be determined by (i) tracking of the coating process in the memory 710; by (ii) monitoring the application area of the surface via sensors 150; and/or (iii) by other means. If the entire surface has not been completely covered, the method continues with step 860. If the entire surface has been completely covered, then in step 865 the method stops, possibly with suitable indicators, reports, or other "finishing" responses.

In step 860, and since the surface is not yet completely covered with the coating, the method determines a second successive localized area for coating application, which will generally be either an area not yet covered or an area due for a second or third coating. The method then returns to step 815 for a determination of the current relative position of the robot in relation to the successive localized area now targeted for coating.

Method 800 enables the apparatus 100 to autonomously apply the liquid coating to a plurality of successive designated areas on the surface, thereby covering the entire surface with the coating.

Operations Example

For an example of operation, and consistent with embodiments of robot 100 discussed throughout this document, consider the case where the apparatus 100 is starting in the right hand corner of a blank wall that is 10 feet high and 20 feet long. To start the coating operation, the apparatus 100 may move the extension plate 125 up and down and articulate the arm 120 in a manner to paint an initial, rightmost 4 feet wide and 10 feet tall area of the wall by first cutting in the 4-foot ceiling edge of this area using the fine line nozzle 305.1 of the spray head assembly 160, then cutting in the 10-foot right-hand edge in the corner using the fine line nozzle 305.1 of the spray head assembly 160, and then cutting in the 4-foot floor edge of this area using the fine line nozzle 305.1. Next, the apparatus 100 may switch to a medium, three-inch spray pattern nozzle 305.2 of the spray head assembly 160 and spray paint to slightly overlap and widen the cut-in paint lines in the reverse order just described. In some operations, this may be repeated to provide 2 coats from the medium nozzle. Finally, the apparatus 100 may switch to a wide, 12-inch spray pattern nozzle 305.3 of the spray head assembly 160 and spray paint using up-to-down and down-to-up using a double overlap technique to fill in, right-to-left, the approximately 10×20 foot area within the paint that was applied with the medium nozzle. One half of the final swath on the left-hand edge of this area (i.e., the leftmost 6 inches in this example) will have only a single coat of the paint when the apparatus 100 finishes the 10×20 foot area.

Next the apparatus 100 will reposition itself, via wheels 107, three feet and six inches to the left of its initial position, and repeat painting the next ten-foot by four-foot area in a similar manner. Because it has moved away from the corner, the apparatus 100 will cut in and medium spray only the ceiling and floor edges of the new ten-foot by four-foot area, and because it has moved three feet and six inches to the left, the initial, rightmost, up-to-down fill stroke using the wide spray pattern will provide the second coat on the one-coat half of the final swath from the previous location of the apparatus 100.

The apparatus 100 will repeat this process about 6 more times in painting the 20 foot wall, with special processing after the last move of the mobile platform 105 to cut in the left hand corner of the blank wall and to fill in the final area using right-to-left swaths in order to provide at least two coats on all wall surfaces. In various implementations, the apparatus 100 may apply coatings to ceilings in a similar manner.

When the apparatus 100 recognizes an object, obstacle or feature in the surface being painted, such as an electrical outlet or a window, it may navigate the object similar to a floor or ceiling or wall border—first cut in using the fine line spray, then widened with the medium spray pattern, and then later overlapping using the wide spray pattern. As noted previously, the apparatus 100 may detect the object, obstacle or feature, as well as floor, ceiling, and corner boundaries, using its sensors 150 and associated processing logic and modules, and may calculate where to position the spray assembly 160 and when to start and stop spraying using its computer or logic circuitry 175.

In some embodiments, the apparatus 100 may compare recognized, real-life objects, obstacles or features (or lack thereof) in the surface being painted with planned features shown in the 3d model from the architectural plan, and decide how to proceed based on both this comparison and either or both of (i) a general rule-set and/or (ii) project-specific rules. In various implementations, the apparatus 100 may continue applying paint when a recognized, real-life object approximately matches what is expected from the 3-D model, within a predefined or operator-definable tolerance. Thus, objects that are detected near, but not in the exact location indicated by the 3-D model (e.g. a light switch that is within 16 inches of its planned location) will be processed (e.g., painted around) in accordance with their real-world location. On the other hand, if the apparatus 100 detects objects that are outside the tolerance limit from their expected location, or are missing altogether, then the apparatus 100 may generate an alert to a user/manager and/or cease painting to allow a user/manager to investigate.

In various implementations, the apparatus 100 may operate, or may have a mode of operation, that works without any 3D model, or architectural plans, or other preloaded data describing the object that is to be painted, such as a wall or a room. In such implementations, the apparatus 100 may, for example, be positioned in front of a wall(s) and activated to: (i) scan the wall(s) with its sensors 150 to determine the wall's dimension and features, (ii) create a plan for painting the wall(s) based on the scan data, and then (iii) paint the wall(s) according to the plan. The plan may use the stored digital representations of known features and obstacles (which representations may be or include sensor data stored in a library 520) to identify or recognize in real-time the real-life surfaces, objects, features, obstacles and environments that the sensors 150 are currently detecting. A user or operator may direct the apparatus 100 regarding what type (e.g., color) of paint to put on the wall by specifying a specific paint reservoir 185 to use, where different reservoirs 185 may be loaded with different paint types.

Storage and Recharging Station

FIG. 6 is a top perspective view of an example of a storage, recharging, and monitoring unit 600 that interconnects with an autonomous, mobile, coating-application apparatus 100, consistent with the principles of the present system and method. As shown in the example of FIG. 6, the storage, recharging, and monitoring unit 600 includes material storage areas 605 (e.g., coating or paint reservoirs), a rechargeable power source (not shown), a cord and plug for an electrical outlet (not shown), a computer (not shown), a wireless network interface (not shown), and a monitor station 610, such as a touchscreen monitor. In an embodiment, the storage and recharging station may include wheels or other ground transport elements enabling the station to move to within close proximity of an autonomous mobile coating application apparatus 100.

The storage, recharging, and monitoring unit 600 also includes a charging connector 615 and one or more material refill connectors 620. In various implementations, the autonomous, mobile, coating-application apparatus 100 has corresponding connectors that mate with the connectors 615, 620. The unit 600 and the connectors 615, 620 are configured such that the storage, recharging, and monitoring unit 600 and/or the autonomous, mobile, coating-application apparatus 100 can maneuver to abut each other and mate the connectors 615, 620 to the corresponding connectors of the apparatus 100. Once mated, the unit 600 may transfer coating material from the material storage areas 605 and/or transfer power from its rechargeable power source to the coating-application apparatus 100.

In various implementations, the monitor station 600 may display the operational status (e.g., progress reports, supply reports, error messages, exception messages, and the like) from one or more apparatus 100, which status may be received via direct (device-to-device) or indirect (via an Internet server) wired or wireless communications.

Other Embodiments

While the present system and method has been described above in various exemplary embodiments, persons skilled in the relevant arts will appreciate that other embodiments are within the scope and spirit of the system and method disclosed herein.

For example, while exemplary embodiments taught herein typically discuss the application of a liquid coating to a surface, the system and method is not strictly limited to surface coatings per se. For example, the system and method may be used to apply a liquid or spray to a porous material or an absorbent material, where the liquid may then penetrate to regions of the receiving material which are interior to (that is, below) the surface of the material.

For example, the system and method may be used, with a suitable putty applicator in place of the fluid applicator 160, to apply a putty (such as caulking or other gels or foams) to a structural material. In such an embodiment, suitable putty reservoirs and putty pressure application units would be employed in place of fluid coating reservoirs 185 and compressed air source 180, respectively.

In an embodiment, a plurality of fluid reservoirs 185 may each store a different coating fluid, and the fluid applicator may be configured to apply at least one of: a different respective coating fluid to different respective areas of the surface, and a mixture of two or more coating fluids to a specified area of the surface.

SUMMARY

Other embodiments of the invention will be apparent to those skilled in the art from consideration of the specification and practice of the invention disclosed herein. It is intended that the specification and examples be considered as exemplary only, with a true scope and spirit of the invention being indicated by the claims of this document.

What is claimed is:

1. An apparatus for autonomously applying a coating to a surface of a structure, the apparatus comprising:
   a mobile platform with a steerable ground transport element configured for powered navigation along a supporting surface which is interior to or immediately exterior to the structure;
   a vertical beam mounted substantially perpendicular to a surface of the mobile platform;
   an extension plate mounted on the vertical beam such the extension plate extends parallel to a longitudinal axis of the vertical beam, wherein the extension plate is configured to move along the longitudinal axis of the vertical beam;
   a robotic arm attached at a proximal first end to the extension plate, enabling the robotic arm to move through a respective range of motion unrestricted by the vertical beam, the robotic arm being configured to be directed in a plurality of directions relative to the mobile platform, the robotic arm comprising a distal second end;
   a servo-mechanism configured to position the distal second end of the robotic arm at a dynamically adjustable position relative to a designated area on the surface of the structure;
   a fluid reservoir configured to store a liquid coating;
   a fluid dispenser attached at or near the distal second end of the robotic arm, the fluid dispenser being configured to receive the liquid coating from the fluid reservoir and to dispense the liquid coating for application to the surface of the structure;
   a sensor configured to provide sensor data indicative of at least a relative position of the apparatus in relation to the designated area on the surface of the structure and a feature of the surface of the structure;
   a memory configured to store instructions for coating the surface of the structure; and
   a hardware processor configured to perform operations comprising:
   (i) identifying, based on a digital representation of the structure stored in the memory, a first designated area of the surface of the structure for application of the liquid coating;
   (ii) autonomously navigating the apparatus via actuation of the steerable ground transport element to a predetermined position relative to the first designated area based on the sensor data;
   (iii) actuating the servo mechanism to position the fluid dispenser within a predetermined coating range of the first designated area;
   (iv) actuating the servo mechanism to move the fluid dispenser of the robotic arm in a direction substantially parallel to the first designated area of the surface while dispensing the liquid coating from the fluid dispenser onto the first designated area on the surface;
   (v) in response to determining that the first designated area has been covered by the liquid coating, identifying a second designated area of the surface of the structure for coverage by the liquid coating e based on the digital representation of the structure; and
   (vi) repeat steps (ii) to (v) to cover the second designated area with the liquid coating;
   wherein the fluid dispenser comprises a nozzle which is configurable to dispense the liquid coating onto the surface with a substantially precise line of transition between a first surface area where the liquid coating has been applied and a second adjacent surface area where the liquid coating has not been applied; and
   wherein the sensor comprises an optical sensor, and wherein the operations further comprise adjusting a precision of the line of transition based on data from the optical sensor indicating detection of the line of transition.

2. The apparatus of claim 1, wherein the memory is configured to store a digital representation of the surface to be coated.

3. The apparatus of claim 2, wherein the operations further comprise directing the apparatus to coat the surface of the structure in accordance with the digital representation of the surface of the structure.

4. The apparatus of claim 2, wherein the digital representation of the surface of the structure to be coated further comprises an indicator of a surface area which is designated to not receive the coating, and wherein the operations further comprise directing the apparatus so as to not coat the surface area so designated.

5. The apparatus of claim 2, wherein the navigating comprises moving the apparatus within a room according to the digital representation, wherein the navigating results in a change of location of the apparatus enabling autonomous coating of the surface of the structure.

6. The apparatus of claim 1, wherein the operations further comprise adjusting a precision of the line of transition by adjusting at least one of: (i) a speed of movement of the fluid dispenser in a direction parallel to the surface of the structure, (ii) a pressure at which the liquid coating is applied to the surface of the structure from the fluid dispenser, (iii) a distance from the fluid dispenser to the surface of the structure, or (iv) a viscosity of the applied liquid coating.

7. The apparatus of claim 1, wherein the operations further comprise adjusting a precision of the line of transition by adjusting at least one of: (i) a dilation of an inlet of the nozzle, (ii) a dilation of an outlet of the nozzle, or (iii) a shape of the nozzle.

8. The apparatus of claim 1, wherein the memory is configured to store at least one of:
   a digital map of the structure; or
   operational parameters pertaining to the operations of the hardware processor.

9. The apparatus of claim 8, wherein the operations further comprise dynamically mapping at least one of the structure, a room, or the surface of the structure, thereby generating the digital map of the structure, via the sensor.

* * * * *